United States Patent
Chen et al.

(10) Patent No.: US 9,052,492 B2
(45) Date of Patent: Jun. 9, 2015

(54) IMAGING LENS, AND ELECTRONIC APPARATUS INCLUDING THE SAME

(71) Applicant: Genius Electronic Optical Co., Ltd., Taichung (TW)

(72) Inventors: Shih-Han Chen, Taichung (TW); Kai-Lun Wang, Xiamen (CN); Cong-Hao Yang, Xiamen (CN)

(73) Assignee: Genius Electronic Optical Co., Ltd. (TW)

( * ) Notice: Subject to any disclaimer, the term of this patent is extended or adjusted under 35 U.S.C. 154(b) by 0 days.

(21) Appl. No.: 14/029,965

(22) Filed: Sep. 18, 2013

(65) Prior Publication Data

US 2014/0320982 A1 Oct. 30, 2014

(30) Foreign Application Priority Data

Apr. 24, 2013 (CN) .......................... 2013 1 0144786

(51) Int. Cl.
*G02B 13/00* (2006.01)
*G02B 9/60* (2006.01)
*G02B 13/04* (2006.01)

(52) U.S. Cl.
CPC .............. *G02B 13/0045* (2013.01); *G02B 9/60* (2013.01); *G02B 13/04* (2013.01)

(58) Field of Classification Search
CPC ...... G02B 13/0045; G02B 13/18; G02B 9/60; H04N 5/225
USPC .......................................... 359/714, 763, 764
See application file for complete search history.

(56) References Cited

U.S. PATENT DOCUMENTS

| | | | |
|---|---|---|---|
| 7,480,105 B2 | 1/2009 | Mori | |
| 7,486,449 B2 | 2/2009 | Miyano | |
| 7,502,181 B2 | 3/2009 | Shinohara | |
| 7,639,432 B2 | 12/2009 | Asami | |
| 7,684,127 B2 | 3/2010 | Asami | |
| 7,826,151 B2 | 11/2010 | Tsai | |
| 7,864,454 B1 | 1/2011 | Tang et al. | |
| 8,000,030 B2 | 8/2011 | Tang | |
| 8,000,031 B1 | 8/2011 | Tsai | |
| 8,189,273 B2 | 5/2012 | Noda | |
| 8,233,224 B2 | 7/2012 | Chen | |
| 8,363,337 B2 | 1/2013 | Tang et al. | |
| 2010/0265593 A1 | 10/2010 | Tang | |
| 2012/0092544 A1 | 4/2012 | Noda | |
| 2012/0092778 A1 | 4/2012 | Tsai et al. | |
| 2012/0147482 A1 | 6/2012 | Tsai | |

FOREIGN PATENT DOCUMENTS

| | | |
|---|---|---|
| CN | 102313970 A | 1/2012 |
| CN | 102483504 A | 5/2012 |
| TW | 201022714 A1 | 6/2010 |

*Primary Examiner* — David N Spector
(74) *Attorney, Agent, or Firm* — Baker & McKenzie LLP

(57) ABSTRACT

An imaging lens includes first to fifth lens elements arranged from an object side to an image side in the given order. The first lens element has a positive refractive power and a convex object-side surface. The second lens element has a negative refractive power and an image-side surface with a concave peripheral portion. The third lens element has an object-side surface with a concave peripheral portion. The fourth lens element has an image-side surface with a concave portion in a vicinity of an optical axis. The fifth lens element has an image-side surface with a concave portion in the vicinity of the optical axis and a convex peripheral portion.

18 Claims, 32 Drawing Sheets system focal length =3.276 mm, half field-of-view =35.164°, F-number =2.40, system length =3.905mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.14 | | | | |
| first lens element 3 | object-side surface 31 | 1.271 | 0.520 | 1.544 | 56.114 | plastic | 2.074 |
| | image-side surface 32 | -8.878 | 0.058 | | | | |
| second lens element 4 | object-side surface 41 | 19.733 | 0.225 | 1.640 | 23.265 | plastic | -4.040 |
| | image-side surface 42 | 2.290 | 0.576 | | | | |
| third lens element 5 | object-side surface 51 | -1.185 | 0.416 | 1.544 | 56.114 | plastic | 3.076 |
| | image-side surface 52 | -0.781 | 0.099 | | | | |
| fourth lens element 6 | object-side surface 61 | 4.732 | 0.308 | 1.544 | 56.114 | plastic | -2.703 |
| | image-side surface 62 | 1.099 | 0.213 | | | | |
| fifth lens element 7 | object-side surface 71 | 2.016 | 0.438 | 1.544 | 56.114 | plastic | 38.325 |
| | image-side surface 72 | 2.060 | 0.300 | | | | |
| optical filter 8 | object-side surface 81 | ∞ | 0.300 | | | | |
| | image-side surface 82 | ∞ | 0.452 | | | | |
| image plane 9 | | ∞ | | | | | |

FIG. 3

| surface | 31 | 32 | 41 | 42 | 51 |
|---|---|---|---|---|---|
| K | -11.37908 | -99.08943 | 611.4688 | -41.58115 | -1.871982 |
| a4 | 0.552492 | -0.0037459 | 0.1738243 | 0.605367 | -0.2297858 |
| a6 | -1.006271 | -0.3332686 | -0.3674094 | -0.8235753 | 0.4953667 |
| a8 | 1.055209 | -0.4444647 | -0.3436947 | 0.8800427 | -0.4410055 |
| a10 | -0.602044 | 0.7083542 | 0.7367213 | 0.3188763 | 1.0302223 |
| a12 | 0.236891 | 0.7625601 | 1.0456536 | -0.4105064 | -1.0470534 |
| a14 | -2.757999 | -1.77701662 | -0.6013874 | -0.7357803 | -0.04113 |
| a16 | 2.305996 | 0.2817381 | -1.1190923 | 0.8275201 | 0.238091 |
| surface | 52 | 61 | 62 | 71 | 72 |
| K | -0.8325156 | 8.673344 | -6.81818 | 0 | 0 |
| a4 | 0.2517817 | -0.221549 | -0.201349 | -0.279819 | -0.278888 |
| a6 | -0.2370727 | 0.138574 | 0.078804 | 0.03075 | 0.105024 |
| a8 | 0.3327215 | -0.046919 | -0.045386 | 0.014435 | -0.022464 |
| a10 | 0.3571463 | -0.008359 | 0.014639 | -0.002929 | 0.00152 |
| a12 | -0.472578 | 0.003861 | -0.000113 | | |
| a14 | -0.0022139 | 0.001714 | -0.00158 | | |
| a16 | 0.0739291 | -0.000512 | 0.000431 | | |

FIG. 4 system focal length =3.260 mm, half field-of-view =35.644°, F-number =2.40, system length =3.925mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.14 | | | | |
| first lens element 3 | object-side surface 31 | 1.290 | 0.567 | 1.544 | 56.114 | plastic | 2.084 |
| | image-side surface 32 | -8.156 | 0.046 | | | | |
| second lens element 4 | object-side surface 41 | 19.726 | 0.211 | 1.640 | 23.265 | plastic | -4.050 |
| | image-side surface 42 | 2.296 | 0.554 | | | | |
| third lens element 5 | object-side surface 51 | -1.219 | 0.434 | 1.544 | 56.114 | plastic | 3.032 |
| | image-side surface 52 | -0.790 | 0.069 | | | | |
| fourth lens element 6 | object-side surface 61 | 4.577 | 0.315 | 1.544 | 56.114 | plastic | -2.718 |
| | image-side surface 62 | 1.093 | 0.196 | | | | |
| fifth lens element 7 | object-side surface 71 | 2.006 | 0.488 | 1.544 | 56.114 | plastic | 34.158 |
| | image-side surface 72 | 2.055 | 0.300 | | | | |
| optical filter 8 | object-side surface 81 | ∞ | 0.300 | | | | |
| | image-side surface 82 | ∞ | 0.447 | | | | |
| image plane 9 | | ∞ | | | | | |

FIG. 7

| surface | 31 | 32 | 41 | 42 | 51 |
|---|---|---|---|---|---|
| K | -11.55417 | -137.497 | 612.3553 | -43.48304 | -1.758189 |
| a4 | 0.554281 | -0.0009074 | 0.1757645 | 0.5886706 | -0.243525 |
| a6 | -0.997524 | -0.3257385 | -0.378103 | -0.8090248 | 0.477144 |
| a8 | 1.08157 | -0.4239521 | -0.3793676 | 0.8650339 | -0.426377 |
| a10 | -0.550456 | 0.7254744 | 0.7035819 | 0.2145536 | 1.0302223 |
| a12 | 0.314797 | 0.7745376 | 1.026422 | -0.5376064 | -1.0027246 |
| a14 | -2.676429 | -1.7500405 | -0.6007472 | -0.6705219 | -0.0742385 |
| a16 | 2.319198 | 0.3060678 | -1.0104638 | 1.353735 | 0.0317141 |
| surface | 52 | 61 | 62 | 71 | 72 |
| K | -0.8045926 | 8.359472 | -6.214494 | 0 | 0 |
| a4 | 0.238208 | -0.217538 | -0.202527 | -0.279629 | -0.278983 |
| a6 | -0.2428323 | 0.137406 | 0.079104 | 0.03079 | 0.105006 |
| a8 | 0.331288 | -0.047297 | -0.04531 | 0.014459 | -0.022469 |
| a10 | 0.3571463 | -0.008468 | 0.014642 | -0.002914 | 0.001518 |
| a12 | -0.4720965 | 0.003793 | -0.000115 | | |
| a14 | -0.0025355 | 0.001647 | -0.00158 | | |
| a16 | 0.0716088 | -0.000512 | 0.000432 | | |

FIG. 8 system focal length =3.226mm, half field-of-view =36.097°, F-number =2.4, system length =3.855mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.14 | | | | |
| first lens element 3 | object-side surface 31 | 1.270 | 0.517 | 1.544 | 56.114 | plastic | 2.078 |
| | image-side surface 32 | -9.092 | 0.060 | | | | |
| second lens element 4 | object-side surface 41 | 20.300 | 0.231 | 1.640 | 23.265 | plastic | -3.943 |
| | image-side surface 42 | 2.249 | 0.544 | | | | |
| third lens element 5 | object-side surface 51 | -1.169 | 0.415 | 1.544 | 56.114 | plastic | 2.995 |
| | image-side surface 52 | -0.767 | 0.060 | | | | |
| fourth lens element 6 | object-side surface 61 | 4.606 | 0.379 | 1.544 | 56.114 | plastic | -2.766 |
| | image-side surface 62 | 1.104 | 0.216 | | | | |
| fifth lens element 7 | object-side surface 71 | 2.020 | 0.390 | 1.544 | 56.114 | plastic | 42.315 |
| | image-side surface 72 | 2.063 | 0.300 | | | | |
| optical filter 8 | object-side surface 81 | ∞ | 0.300 | | | | |
| | image-side surface 82 | ∞ | 0.443 | | | | |
| image plane 9 | | ∞ | | | | | |

FIG. 11

| surface | 31 | 32 | 41 | 42 | 51 |
|---|---|---|---|---|---|
| K | -11.11976 | -63.53122 | 645.8126 | -40.89196 | -2.199605 |
| a4 | 0.552517 | -0.007675 | 0.1703655 | 0.616023 | -0.2226294 |
| a6 | -1.009289 | -0.3381875 | -0.3913121 | -0.827777 | 0.4943589 |
| a8 | 1.051089 | -0.4492575 | -0.3963689 | 0.8127682 | -0.4442173 |
| a10 | -0.60206 | 0.6829875 | 0.7298874 | 0.3218821 | 1.0205134 |
| a12 | 0.248325 | 0.6787968 | 1.1400364 | -0.2601378 | -1.0372479 |
| a14 | -2.776061 | -1.8314166 | -0.4341523 | -0.6086154 | -0.022221 |
| a16 | 2.073942 | 0.6558726 | -1.1304611 | 0.5175491 | 0.2121355 |
| surface | 52 | 61 | 62 | 71 | 72 |
| K | -0.838958 | 8.753993 | -7.038235 | 0 | 0 |
| a4 | 0.2544516 | -0.220535 | -0.201474 | -0.279973 | -0.277959 |
| a6 | -0.2337399 | 0.138475 | 0.078755 | 0.030727 | 0.105185 |
| a8 | 0.3351034 | -0.047048 | -0.045381 | 0.014431 | -0.022429 |
| a10 | 0.3570626 | -0.008416 | 0.014645 | -0.00293 | 0.001528 |
| a12 | -0.473647 | 0.003852 | -0.000111 | | |
| a14 | -0.0048763 | 0.001725 | -0.00158 | | |
| a16 | 0.0699196 | -0.000513 | 0.00043 | | |

FIG. 12

FIG. 15 system focal length =3.288mm, half field-of-view =35.669°, F-number =2.40, system length =3.942mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.14 | | | | |
| first lens element 3 | object-side surface 31 | 1.337 | 0.536 | 1.544 | 56.114 | plastic | 2.200 |
| | image-side surface 32 | -10.169 | 0.056 | | | | |
| second lens element 4 | object-side surface 41 | 20.617 | 0.233 | 1.640 | 23.265 | plastic | -4.300 |
| | image-side surface 42 | 2.432 | 0.635 | | | | |
| third lens element 5 | object-side surface 51 | -1.260 | 0.407 | 1.544 | 56.114 | plastic | 2.842 |
| | image-side surface 52 | -0.774 | 0.059 | | | | |
| fourth lens element 6 | object-side surface 61 | 4.835 | 0.405 | 1.544 | 56.114 | plastic | -2.568 |
| | image-side surface 62 | 1.055 | 0.201 | | | | |
| fifth lens element 7 | object-side surface 71 | 2.084 | 0.379 | 1.544 | 56.114 | plastic | 30.429 |
| | image-side surface 72 | 2.230 | 0.300 | | | | |
| optical filter 8 | object-side surface 81 | ∞ | 0.300 | | | | |
| | image-side surface 82 | ∞ | 0.431 | | | | |
| image plane 9 | | ∞ | | | | | |

| surface | 31 | 32 | 41 | 42 | 51 |
|---|---|---|---|---|---|
| K | -12.21277 | -202.5905 | 641.6037 | -48.75305 | -2.508467 |
| a4 | 0.53116 | 0.0009163 | 0.157746 | 0.5506816 | -0.2395063 |
| a6 | -0.971585 | -0.310334 | -0.3657144 | -0.8117064 | 0.3971997 |
| a8 | 1.046907 | -0.4159999 | -0.3485533 | 0.8599547 | -0.3516757 |
| a10 | -0.548025 | 0.6883848 | 0.699565 | 0.143171 | 1.0148272 |
| a12 | 0.327497 | 0.6935845 | 0.9428109 | -0.4957076 | -1.0486162 |
| a14 | -2.631603 | -1.7215043 | -0.5464741 | -0.2541083 | -0.1080011 |
| a16 | 2.318612 | 0.6357239 | -0.7566501 | 0.8223139 | 0.3387514 |
| surface | 52 | 61 | 62 | 71 | 72 |
| K | -0.8235085 | 8.921569 | -6.626967 | 0 | 0 |
| a4 | 0.2620612 | -0.194512 | -0.187784 | -0.272148 | -0.251307 |
| a6 | -0.2531503 | 0.145495 | 0.078862 | 0.028492 | 0.098503 |
| a8 | 0.3113302 | -0.057709 | -0.047342 | 0.014238 | -0.020581 |
| a10 | 0.3571649 | -0.004737 | 0.014811 | -0.00276 | 0.001465 |
| a12 | -0.4476674 | 0.00549 | 7.18E-05 | | |
| a14 | 0.010013 | 0.000695 | -0.001574 | | |
| a16 | 0.0624727 | -0.00049 | 0.00037 | | |

FIG. 16 system focal length =3.217mm, half field-of-view =36.429°, F-number =2.40, system length =3.943mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | −0.14 | | | | |
| first lens element 3 | object-side surface 31 | 1.337 | 0.544 | 1.544 | 56.114 | plastic | 2.143 |
| | image-side surface 32 | −8.040 | 0.057 | | | | |
| second lens element 4 | object-side surface 41 | 18.798 | 0.230 | 1.640 | 23.265 | plastic | −4.418 |
| | image-side surface 42 | 2.461 | 0.468 | | | | |
| third lens element 5 | object-side surface 51 | −1.336 | 0.535 | 1.544 | 56.114 | plastic | 2.757 |
| | image-side surface 52 | −0.808 | 0.069 | | | | |
| fourth lens element 6 | object-side surface 61 | 5.284 | 0.403 | 1.544 | 56.114 | plastic | −2.519 |
| | image-side surface 62 | 1.062 | 0.267 | | | | |
| fifth lens element 7 | object-side surface 71 | 2.049 | 0.373 | 1.544 | 56.114 | plastic | 39.758 |
| | image-side surface 72 | 2.118 | 0.300 | | | | |
| optical filter 8 | object-side surface 81 | ∞ | 0.300 | | | | |
| | image-side surface 82 | ∞ | 0.396 | | | | |
| image plane 9 | | ∞ | | | | | |

FIG. 19

| surface | 31 | 32 | 41 | 42 | 51 |
|---|---|---|---|---|---|
| K | -12.63537 | -148.9323 | 553.3358 | -53.80963 | -2.871583 |
| a4 | 0.541642 | -0.0004938 | 0.1758638 | 0.5738294 | -0.2031686 |
| a6 | -1.005594 | -0.3312669 | -0.3897838 | -0.821747 | 0.4526726 |
| a8 | 1.075732 | -0.4410485 | -0.4205846 | 0.8701475 | -0.4071204 |
| a10 | -0.558867 | 0.706983 | 0.6630523 | 0.1736064 | 1.0691317 |
| a12 | 0.309159 | 0.7462007 | 1.0562617 | -0.675414 | -1.118068 |
| a14 | -2.682126 | -1.7394104 | -0.4333468 | -0.7776998 | -0.1885885 |
| a16 | 2.269465 | 0.4780964 | -0.9238775 | 1.7936648 | 0.1697662 |
| surface | 52 | 61 | 62 | 71 | 72 |
| K | -0.8841378 | 9.20299 | -7.151529 | 0 | 0 |
| a4 | 0.2804146 | -0.212748 | -0.202053 | -0.282653 | -0.279388 |
| a6 | -0.2778361 | 0.143855 | 0.079697 | 0.030295 | 0.106265 |
| a8 | 0.3018716 | -0.045989 | -0.045139 | 0.014487 | -0.022158 |
| a10 | 0.357146 | -0.007785 | 0.014679 | -0.002838 | 0.00158 |
| a12 | -0.4552844 | 0.004161 | -1.30E-04 | | |
| a14 | 0.0098176 | 0.001727 | -0.001603 | | |
| a16 | 0.0646551 | -0.000673 | 0.000415 | | |

FIG. 20

FIG. 23 system focal length =3.255mm, half field-of-view =35.628°, F-number =2.4, system length =3.924mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.14 | | | | |
| first lens element 3 | object-side surface 31 | 1.290 | 0.567 | 1.544 | 56.114 | plastic | 2.081 |
| | image-side surface 32 | -8.019 | 0.046 | | | | |
| second lens element 4 | object-side surface 41 | 19.752 | 0.197 | 1.640 | 23.265 | plastic | -4.056 |
| | image-side surface 42 | 2.300 | 0.561 | | | | |
| third lens element 5 | object-side surface 51 | -1.223 | 0.439 | 1.544 | 56.114 | plastic | 3.022 |
| | image-side surface 52 | -0.792 | 0.070 | | | | |
| fourth lens element 6 | object-side surface 61 | 4.584 | 0.319 | 1.544 | 56.114 | plastic | -2.718 |
| | image-side surface 62 | 1.093 | 0.199 | | | | |
| fifth lens element 7 | object-side surface 71 | 2.006 | 0.484 | 1.544 | 56.114 | plastic | 34.350 |
| | image-side surface 72 | 2.054 | 0.300 | | | | |
| optical filter 8 | object-side surface 81 | ∞ | 0.300 | | | | |
| | image-side surface 82 | ∞ | 0.443 | | | | |
| image plane 9 | | ∞ | | | | | |

| surface | 31 | 32 | 41 | 42 | 51 |
|---|---|---|---|---|---|
| K | -11.5001 | -129.6963 | 608.0489 | -43.75634 | -1.75823 |
| a4 | 0.554789 | -0.0010525 | 0.1761307 | 0.5883664 | -0.2431572 |
| a6 | -0.996954 | -0.3252971 | -0.3781138 | -0.8092595 | 0.4783235 |
| a8 | 1.082218 | -0.4229097 | -0.3794474 | 0.8647122 | -0.4245384 |
| a10 | -0.54974 | 0.7266477 | 0.7043092 | 0.2142862 | 1.0302223 |
| a12 | 0.314932 | 0.7743066 | 1.0293599 | -0.537048 | -1.0005049 |
| a14 | -2.679515 | -1.7535342 | -0.5941089 | -0.6672668 | -0.0724364 |
| a16 | 2.307658 | 0.2975401 | -0.9985182 | 1.3618387 | 0.0325677 |
| surface | 52 | 61 | 62 | 71 | 72 |
| K | -0.8042433 | 8.316375 | -6.214548 | 0 | 0 |
| a4 | 0.2380882 | -0.217335 | -0.2202575 | -0.279629 | -0.27896 |
| a6 | -0.2430452 | 0.137178 | 0.079122 | 0.03079 | 0.105022 |
| a8 | 0.3312568 | -0.047411 | -0.045299 | 0.014459 | -0.022466 |
| a10 | 0.3571463 | -0.008512 | 0.014646 | -0.002914 | 0.001518 |
| a12 | -0.4719182 | 0.003775 | -1.14E-04 | | |
| a14 | -0.0023066 | 0.001639 | -0.001579 | | |
| a16 | 0.0718725 | -0.000512 | 0.000432 | | |

FIG. 24

FIG. 27 system focal length =3.311mm, half field-of-view =35.047°, F-number =2.4, system length =3.927mm

| lens element | surface | radius of curvature | thickness | refractive index | Abbe number | material | focal length |
|---|---|---|---|---|---|---|---|
| object | | ∞ | ∞ | | | | |
| aperture stop 2 | | ∞ | -0.14 | | | | |
| first lens element 3 | object-side surface 31 | 1.284 | 0.569 | 1.544 | 56.114 | plastic | 2.092 |
| | image-side surface 32 | -8.707 | 0.045 | | | | |
| second lens element 4 | object-side surface 41 | 20.038 | 0.211 | 1.640 | 23.265 | plastic | -4.036 |
| | image-side surface 42 | 2.293 | 0.617 | | | | |
| third lens element 5 | object-side surface 51 | -1.174 | 0.382 | 1.544 | 56.114 | plastic | 3.078 |
| | image-side surface 52 | -0.771 | 0.069 | | | | |
| fourth lens element 6 | object-side surface 61 | 4.707 | 0.316 | 1.544 | 56.114 | plastic | -2.669 |
| | image-side surface 62 | 1.086 | 0.195 | | | | |
| fifth lens element 7 | object-side surface 71 | 2.023 | 0.480 | 1.544 | 56.114 | plastic | 34.884 |
| | image-side surface 72 | 2.073 | 0.300 | | | | |
| optical filter 8 | object-side surface 81 | ∞ | 0.300 | | | | |
| | image-side surface 82 | ∞ | 0.445 | | | | |
| image plane 9 | | ∞ | | | | | |

| surface | 31 | 32 | 41 | 42 | 51 |
|---|---|---|---|---|---|
| K | -11.55193 | -141.7529 | 612.1334 | -41.32363 | -1.655146 |
| a4 | 0.554604 | -2.50E-05 | -0.372221 | 0.5861726 | -0.2519659 |
| a6 | -0.99663 | -0.3200082 | -0.3617385 | -0.8152452 | 0.4636599 |
| a8 | 1.08277 | -0.4091768 | 0.7385523 | 0.8688251 | -0.4469699 |
| a10 | -0.551094 | 0.7300626 | 1.0710458 | 0.2290693 | 1.0302223 |
| a12 | 0.312327 | 0.7639366 | -0.5738672 | -0.486207 | -1.019711 |
| a14 | -2.662217 | -1.7334969 | -1.0301001 | -0.5782637 | -0.0550676 |
| a16 | 2.41262 | 0.4408324 |  | 1.3656366 | 0.1398763 |
| surface | 52 | 61 | 62 | 71 | 72 |
| K | -0.8072365 | 8.326172 | -6.408519 | 0 | 0 |
| a4 | 0.23818 | -0.219267 | -0.202268 | -0.279621 | -0.278621 |
| a6 | -0.2414549 | 0.136767 | 0.07914 | 0.030807 | 0.105038 |
| a8 | 0.3324928 | -0.047489 | -0.045307 | 0.014469 | -0.022467 |
| a10 | 0.3571463 | -0.008504 | 0.014637 | -0.00291 | 0.001517 |
| a12 | -0.4722583 | 0.003804 | -1.20E-04 |  |  |
| a14 | -0.0034111 | 0.001667 | -0.001582 |  |  |
| a16 | 0.0707288 | -0.000512 | 0.00043 |  |  |

FIG. 28

| relationship | first preferred embodiment | second preferred embodiment | third preferred embodiment | fourth preferred embodiment | fifth preferred embodiment | sixth preferred embodiment | seventh preferred embodiment |
|---|---|---|---|---|---|---|---|
| ALT | 1.907 | 2.014 | 1.933 | 1.960 | 2.085 | 2.006 | 1.957 |
| Gaa | 0.946 | 0.864 | 0.879 | 0.951 | 0.862 | 0.876 | 0.926 |
| BFL | 1.052 | 1.047 | 1.043 | 1.031 | 0.996 | 1.043 | 1.045 |
| T3/T4 + T4/T5 + T5/T3 | 3.107 | 3.147 | 3.006 | 3.005 | 3.106 | 3.137 | 3.124 |
| T4/T2 | 1.371 | 1.497 | 1.642 | 1.739 | 1.750 | 1.625 | 1.499 |
| BFL/G23 | 1.825 | 1.889 | 1.918 | 1.623 | 2.127 | 1.858 | 1.693 |
| (G45+T3)/T2 | 2.800 | 2.992 | 2.733 | 2.609 | 3.490 | 3.248 | 2.742 |
| T1/T2 | 2.311 | 2.694 | 2.239 | 2.300 | 2.366 | 2.885 | 2.703 |
| T5/T3 | 1.053 | 1.123 | 0.940 | 0.931 | 0.697 | 1.102 | 1.255 |
| AG23/T3 | 1.385 | 1.276 | 1.310 | 1.561 | 0.875 | 1.278 | 1.615 |
| Gaa/G23 | 1.642 | 1.560 | 1.617 | 1.497 | 1.840 | 1.561 | 1.500 |
| ALT/T2 | 8.482 | 9.570 | 8.368 | 8.412 | 9.066 | 10.205 | 9.296 |
| (T2+G23)/T1 | 1.542 | 1.348 | 1.498 | 1.620 | 1.284 | 1.336 | 1.455 |

FIG. 30

IMAGING LENS, AND ELECTRONIC APPARATUS INCLUDING THE SAME

CROSS-REFERENCE TO RELATED APPLICATION

This application claims priority to Chinese Application No. 201310144786.X, filed on Apr. 24, 2013.

BACKGROUND OF THE INVENTION

1. Field of the Invention

The present invention relates to an imaging lens and an electronic apparatus including the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

Each of U.S. Pat. Nos. 7,480,105, 7,639,432, 7,486,449 and 7,684,127 discloses a conventional imaging lens with five lens elements. In each of U.S. Pat. Nos. 7,480,105 and 7,639,432, a first lens element thereof has a negative refractive power, and a second lens element thereof has a positive refractive power. In each of U.S. Pat. Nos. 7,486,449 and 7,684,127, each of first and second lens elements thereof has a negative refractive power. However, such arrangements of the refractive power of the lens elements do not lead to good optical characteristics, and each of the imaging lenses disclosed in the abovementioned patents has a system length ranging from 10 mm to 18 mm, failing to reduce an overall length for application to portable devices.

Each of U.S. Pat. Nos. 8,233,224, 8,363,337 and 8,000,030 also discloses a conventional imaging lens with five lens elements, including a first lens element with a positive refractive power and a second lens element with a negative refractive power. While such arrangement of the refractive power of the lens elements may be relatively good, since surface designs of third, fourth and fifth lens elements in these two patents fail to reduce the length of the imaging lens and improve image abbreviation at the same time, the overall length of the imaging lens is not sufficiently reduced in consideration of the image quality. For example, some of the imaging lenses have an overall length of about 6.0 mm, which may need further improvement.

Reducing the system length of the imaging lens while maintaining sufficient optical performance is always a goal in the industry.

SUMMARY OF THE INVENTION

Therefore, an object of the present invention is to provide an imaging lens having a shorter overall length while maintaining good optical performance.

According to one aspect of the present invention, an imaging lens comprises an aperture stop and first, second, third, fourth and fifth lens elements arranged from an object side to an image side in the given order. Each of the first, second, third, fourth and fifth lens elements has an object-side surface facing toward the object side and an image-side surface facing toward the image side.

The first lens element has a positive refractive power, and the object-side surface of the first lens element is a convex surface.

The second lens element has a negative refractive power, and the image-side surface of the second lens element has a concave portion in a vicinity of a periphery of the second lens element.

The object-side surface of the third lens element has a concave portion in a vicinity of a periphery of the third lens element.

The image-side surface of the fourth lens element has a concave portion in a vicinity of an optical axis of the imaging lens.

The image-side surface of the fifth lens element has a concave portion in a vicinity of the optical axis, and a convex portion in a vicinity of a periphery of the fifth lens element.

The imaging lens does not include any lens element with refractive power other than the first, second, third, fourth and fifth lens elements.

Another object of the present invention is to provide an electronic apparatus having an imaging lens with five lens elements.

According to another aspect of the present invention, a portable electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical parameters corresponding to the imaging lens of the first preferred embodiment;

FIG. 4 shows values of some parameters of an optical relationship corresponding to the imaging lens of the first preferred embodiment;

FIG. 7 shows values of some optical parameters corresponding to the imaging lens of the second preferred embodiment;

FIG. 8 shows values of some parameters of an optical relationship corresponding to the imaging lens of the second preferred embodiment;

FIG. 11 shows values of some optical parameters corresponding to the imaging lens of the third preferred embodiment;

FIG. 12 shows values of some parameters of an optical relationship corresponding to the imaging lens of the third preferred embodiment;

FIG. 15 shows values of some optical parameters corresponding to the imaging lens of the fourth preferred embodiment;

FIG. 16 shows values of some parameters of an optical relationship corresponding to the imaging lens of the fourth preferred embodiment;

FIG. 19 shows values of some optical parameters corresponding to the imaging lens of the fifth preferred embodiment;

FIG. 20 shows values of some parameters of an optical relationship corresponding to the imaging lens of the fifth preferred embodiment;

FIG. 23 shows values of some optical parameters corresponding to the imaging lens of the sixth preferred embodiment;

FIG. 24 shows values of some parameters of an optical relationship corresponding to the imaging lens of the sixth preferred embodiment;

FIG. 27 shows values of some optical parameters corresponding to the imaging lens of the seventh preferred embodiment;

FIG. 28 shows values of some parameters of an optical relationship corresponding to the imaging lens of the seventh preferred embodiment;

FIG. 30 is a table that lists values of parameters of other optical relationships corresponding to the imaging lenses of the first to seventh preferred embodiments;

DETAILED DESCRIPTION OF THE PREFERRED EMBODIMENTS

Figure 1:
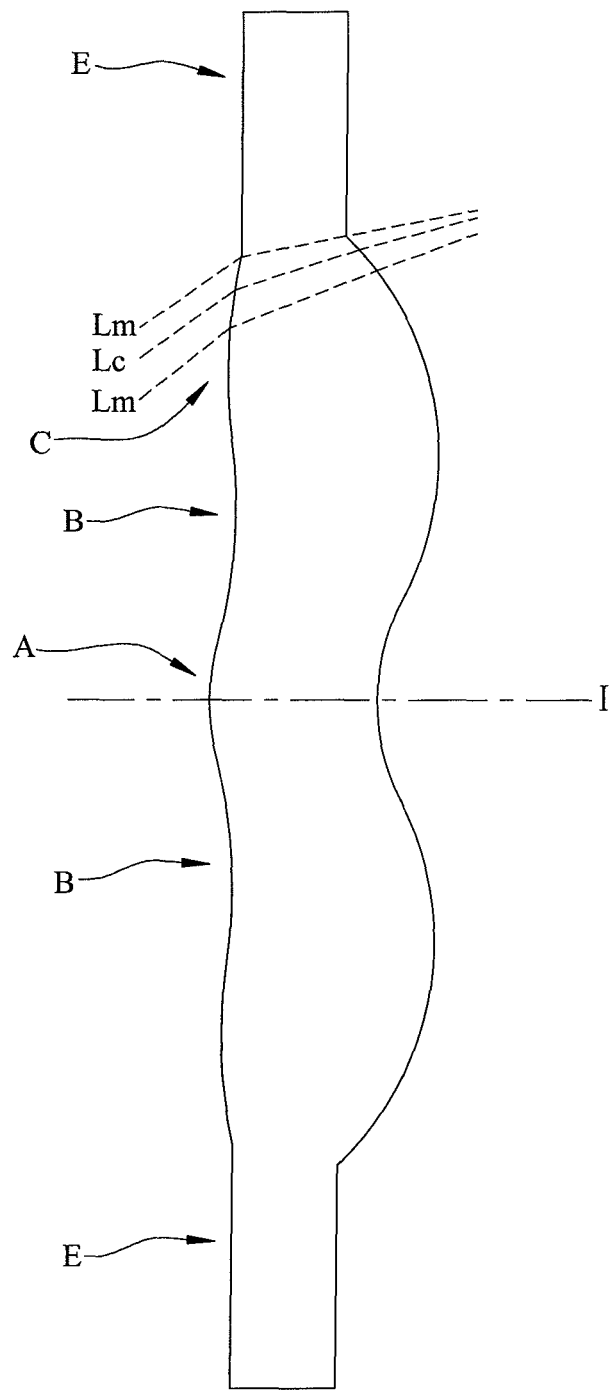
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
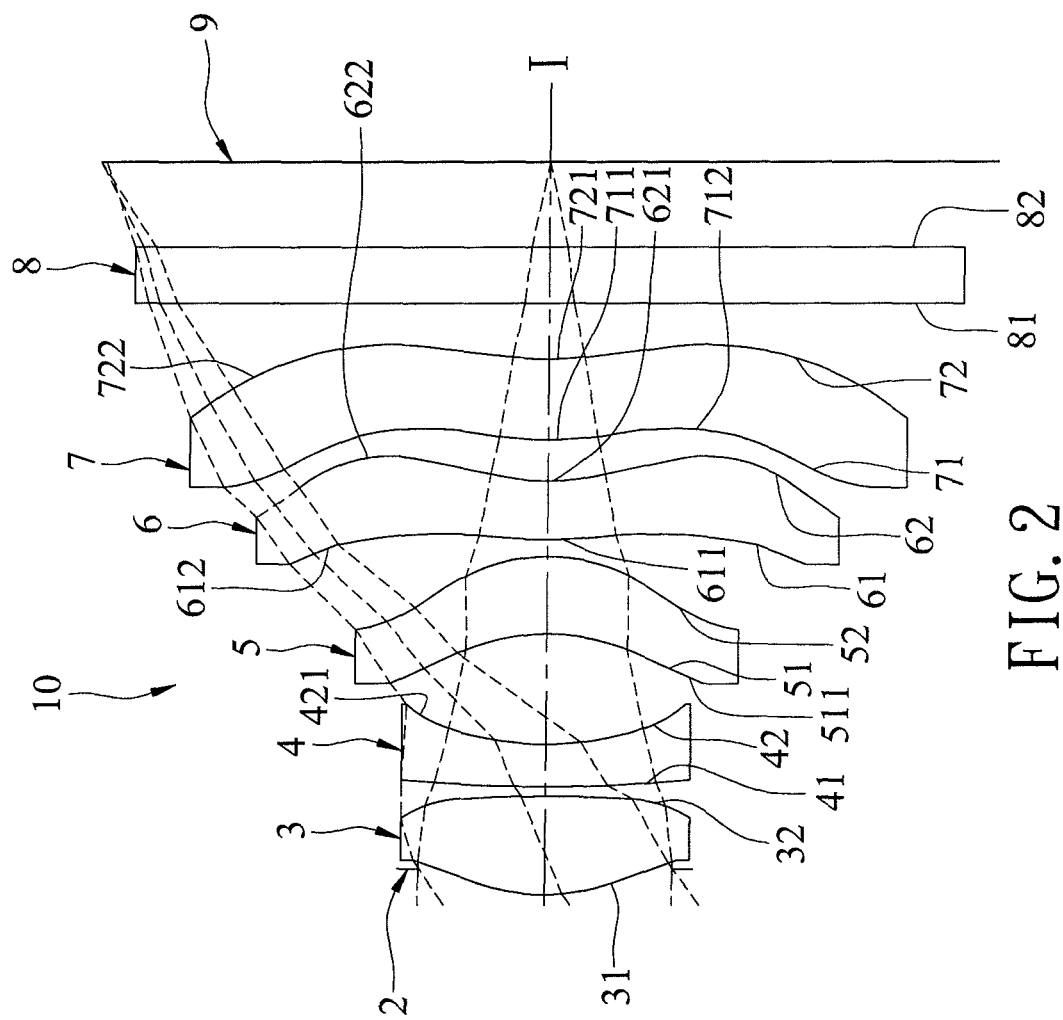
FIG. 2 is a schematic diagram that illustrates the first preferred embodiment of an imaging lens according to the present invention.

Referring to FIG. 2, the first preferred embodiment of an imaging lens 10 according to the present invention includes an aperture stop 2, first, second, third, fourth and fifth lens elements 3-7, and an optical filter 8 arranged in the given order along an optical axis (I) from an object side to an image side. The optical filter 8 is an infrared cut filter for selectively absorbing infrared light to thereby reduce imperfection of images formed at an image plane 9.

Each of the first, second, third, fourth and fifth lens elements 3-7 and the optical filter 8 has an object-side surface 31, 41, 51, 61, 71, 81 facing toward the object side, and an image-side surface 32, 42, 52, 62, 72, 82 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, the object-side and image-side surfaces 71, 72 of the fifth lens element 7, and the object-side and image-side surfaces 81, 82 of the optical filter 8, in the given order, to form an image on the image plane 9. Each of the object-side surfaces 31, 41, 51, 61, 71 and the image-side surfaces 32, 42, 52, 62, 72 is aspherical and has a center point coinciding with the optical axis (I).

The lens elements 3-7 are made of a plastic material in this embodiment, and at least one of the lens elements 3-7 may be made of other materials in other embodiments.

In the first preferred embodiment, which is depicted in FIG. 2, the first lens element 3 has a positive refractive power. The object-side surface 31 of the first lens element 3 is a convex surface, and the image-side surface 32 of the first lens element 3 is a convex surface.

The second lens element 4 has a negative refractive power. The object-side surface 41 of the second lens element 4 is a convex surface. The image-side surface 42 of the second lens element 4 is a concave surface that has a concave portion 421 in a vicinity of a periphery of the second lens element 4.

The third lens element 5 has a positive refractive power. The object-side surface 51 of the third lens element 5 is a concave surface that has a concave portion 511 in a vicinity of a periphery of the third lens element 5. The image-side surface 52 of the third lens element 5 is a convex surface.

The fourth lens element 6 has a negative refractive power. The object-side surface 61 of the fourth lens element 6 has a convex portion 611 in a vicinity of the optical axis (I), and a concave portion 612 in a vicinity of a periphery of the fourth lens element 6. The image-side surface 62 of the fourth lens element 6 has a concave portion 621 in a vicinity of the optical axis (I), and a convex portion 622 in a vicinity of a periphery of the fourth lens element 6.

The fifth lens element 7 has a positive refractive power. The object-side surface 71 of the fifth lens element 7 has a convex portion 711 in a vicinity of the optical axis (I), and a concave portion 712 in a vicinity of a periphery of the fifth lens element 7. The image-side surface 72 of the fifth lens element 7 has a concave portion 721 in a vicinity of the optical axis (I), and a convex portion 722 in a vicinity of the periphery of the fifth lens element 7.

Shown in FIG. 3 is a table that lists values of some optical parameters corresponding to the surfaces 31-81, 32-82 of the first preferred embodiment. The imaging lens 10 has an overall system effective focal length (EFL) of 3.276 mm, a half field-of-view (HFOV) of 35.164°, an F-number of 2.40, and a system length of 3.905 mm. The system length refers to a distance between the object-side surface 31 of the first lens element 3 and the image plane 9.

In this embodiment, each of the object-side surfaces 31-71 and the image-side surfaces 32-72 is aspherical, and satisfies the optical relationship of $$Z(Y) = \frac{Y^2}{R} \bigg/ \left(1 + \sqrt{1-(1+K)\frac{Y^2}{R^2}}\right) + \sum_{i=1}^{n} a_i \times Y^i \quad (1)$$

where:

R represents a radius of curvature of the aspherical surface;

Z represents a depth of an aspherical surface, which is defined as a perpendicular distance between an arbitrary point on the aspherical surface that is spaced apart from the optical axis (I) by a distance Y, and a tangent plane at a vertex of the aspherical surface at the optical axis (I);

Y represents a perpendicular distance between the arbitrary point on the aspherical surface and the optical axis (I);

K represents a conic constant; and $a_i$ represents a $i^{th}$ aspherical coefficient.

Shown in FIG. 4 is a table that lists values of some optical parameters of the aforementioned optical relationship (1) corresponding to the first preferred embodiment.

Relationships among some of the aforementioned optical parameters corresponding to the first preferred embodiment are as follows:

ALT=1.907 mm

Gaa=0.946 mm

BFL=1.052 mm (T3/T4)+(T4/T5)+(T5/T3)=3.107

T4/T2=1.371

BFL/G23=1.825

(G45+T3)/T2=2.800

T1/T2=2.311

T5/T3=1.053

G23/T3=1.385

Gaa/G23=1.642

ALT/T2=8.482

(T2+G23)/T1=1.542 where:

T1 represents a distance between the object-side surface 31 and the image-side surface 32 of the first lens element 3 at the optical axis (I);

T2 represents a distance between the object-side surface 41 and the image-side surface 42 of the second lens element 4 at the optical axis (I);

T3 represents a distance between the object-side surface 51 and the image-side surface 52 of the third lens element 5 at the optical axis (I);

T4 represents a distance between the object-side surface 61 and the image-side surface 62 of the fourth lens element 6 at the optical axis (I);

T5 represents a distance between the object-side surface 71 and the image-side surface 72 of the fifth lens element 7 at the optical axis (I);

ALT represents a sum of the distance between the object-side surface 31 and the image-side surface 32 of the first lens element 3 at the optical axis (I), the distance between the object-side surface 41 and the image-side surface 42 of the second lens element 4 at the optical axis (I), the distance between the object-side surface 51 and the image-side surface 52 of the third lens element 5 at the optical axis (I), the distance between the object-side surface 61 and the image-side surface 62 of the fourth lens element 6 at the optical axis (I), and the distance between the object-side surface 71 and the image-side surface 72 of the fifth lens element 7 at the optical axis (I);

Gaa represents a sum of a distance between the image-side surface 32 of the first lens element 3 and the object-side surface 41 of the second lens element 4 at the optical axis (I), a distance between the image-side surface 42 of the second lens element 4 and the object-side surface 51 of the third lens element 5 at the optical axis (I), a distance between the image-side surface 52 of the third lens element 5 and the object-side surface 61 of the fourth lens element 6 at the optical axis (I), and a distance between the image-side surface 62 of the fourth lens element 6 and the object-side surface 71 of the fifth lens element 7 at the optical axis (I);

BFL represents a distance at the optical axis between the image-side surface of the fifth lens element 7 and the image plane 9 formed by the imaging lens 10 at the image side;

G23 represents the distance between the image-side surface 42 of the second lens element 4 and the object-side surface 51 of the third lens element 5 at the optical axis (I); and G45 represents the distance between the image-side surface 62 of the fourth lens element 6 and the object-side surface 71 of the fifth lens element 7 at the optical axis (I).

FIGS. 5(a) to 5(d) show simulation results corresponding to longitudinal spherical aberration, sagittal astigmatism aberration, tangential astigmatism aberration, and distortion aberration of the first preferred embodiment, respectively. In each of the simulation results, curves corresponding respectively to wavelengths of 470 nm, 555 nm, and 650 nm are shown.

Figure 5:
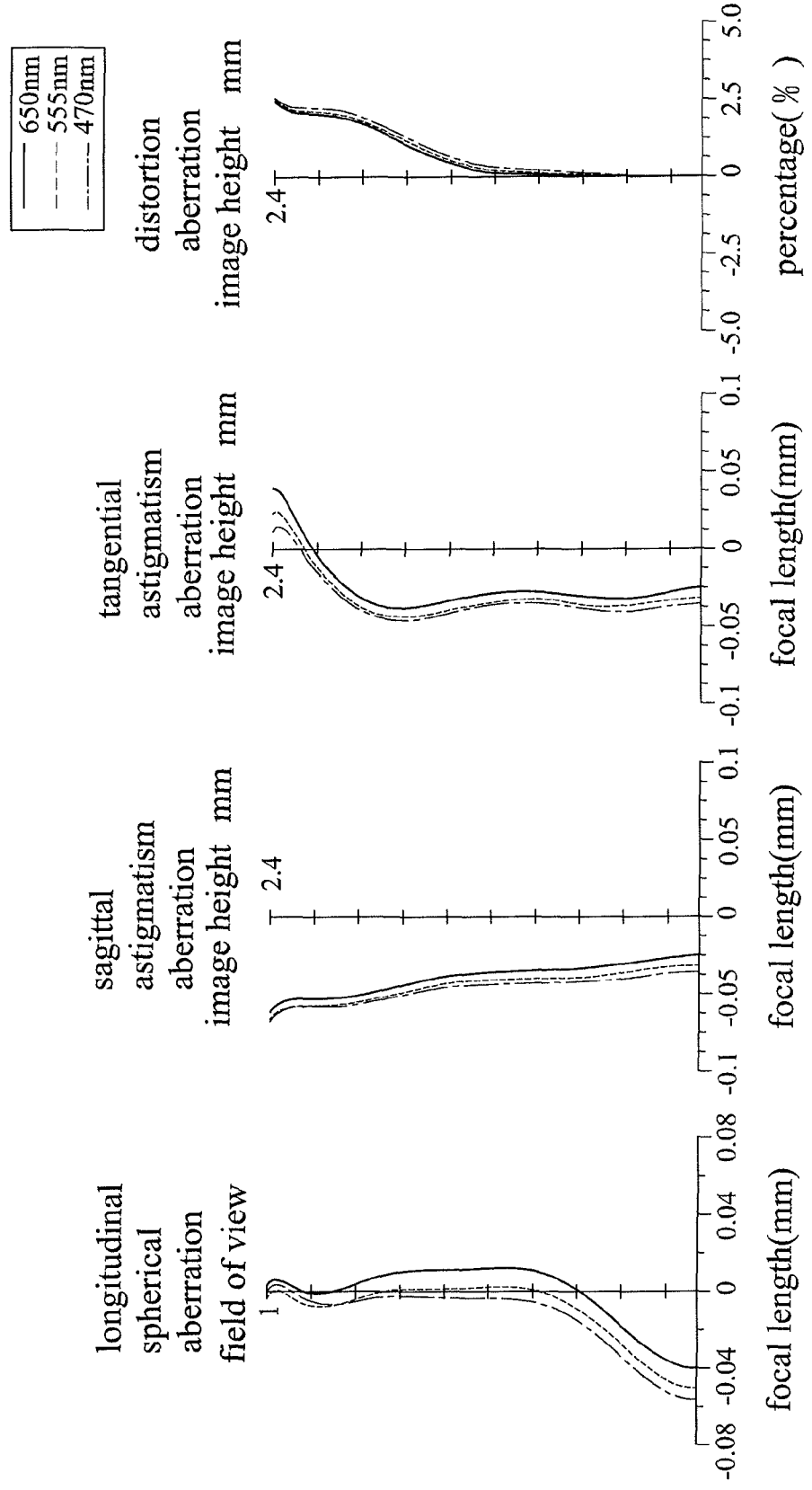
FIGS. 5(a) to 5(d) show different optical characteristics of the imaging lens of the first preferred embodiment.

It can be understood from FIG. 5(a) that, since each of the curves corresponding to longitudinal spherical aberration has a focal length at each field of view (indicated by the vertical axis) that falls within the range of ±0.06 mm, the first preferred embodiment is able to achieve a relatively low spherical aberration at each of the wavelengths. Furthermore, since a deviation in focal length among the curves at each field of view is sufficiently small, the first preferred embodiment has a relatively low chromatic aberration.

It can be understood from FIGS. 5(b) and 5(c) that, since each of the curves falls within the range of ±0.1 mm of focal length, the first preferred embodiment has a relatively low optical aberration.

Moreover, as shown in FIG. 5(d), since each of the curves corresponding to distortion aberration falls within the range of ±2%, the first preferred embodiment is able to meet requirements in imaging quality of most optical systems.

In view of the above, even with the system length reduced down to below 4.0 mm, the imaging lens 10 of the first preferred embodiment is still able to achieve a relatively good optical performance.

Figure 6:
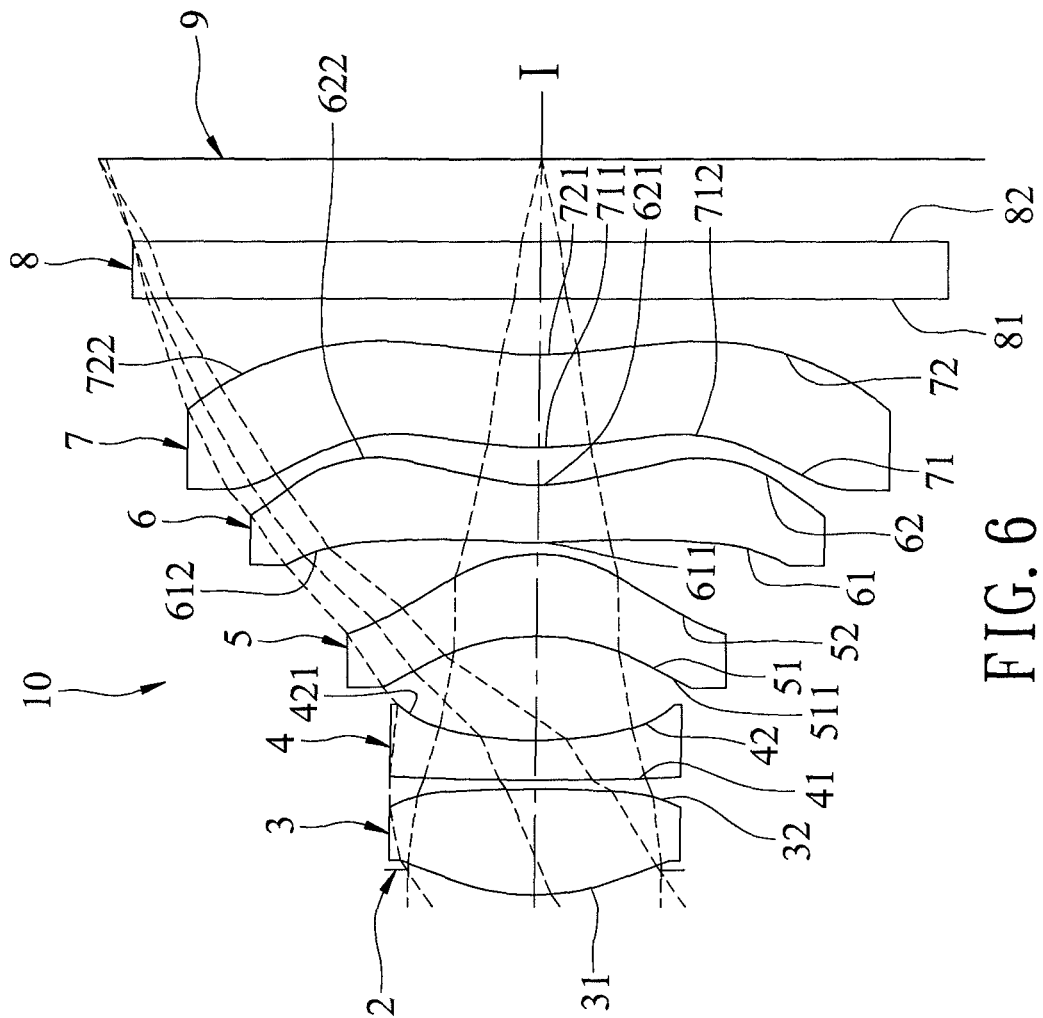
FIG. 6 is a schematic diagram that illustrates the second preferred embodiment of an imaging lens according to the present invention.
Figure 9:
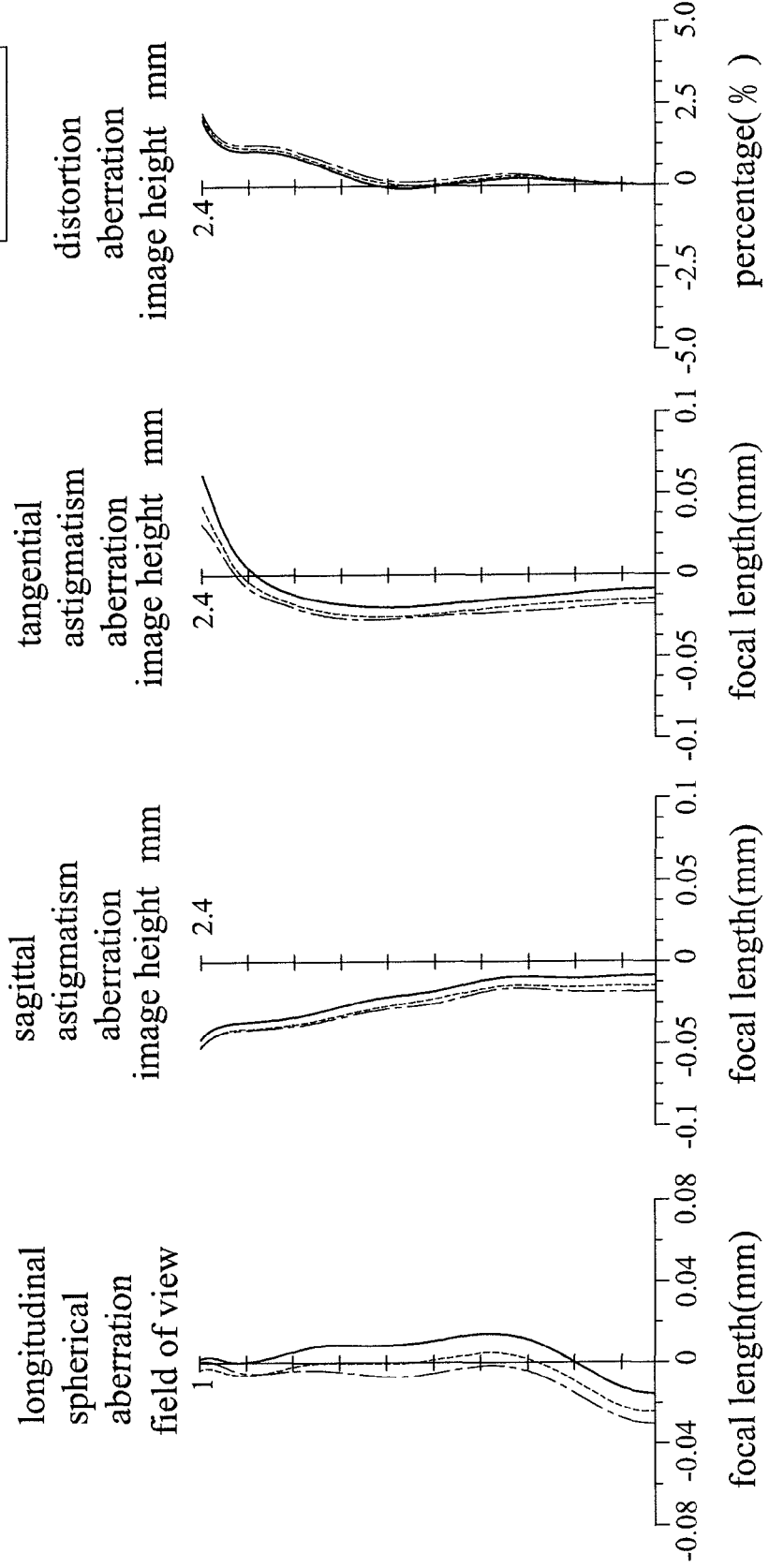
FIGS. 9(a) to 9(d) show different optical characteristics of the imaging lens of the second preferred embodiment.

FIG. 6 illustrates the second preferred embodiment of an imaging lens 10 according to the present invention, which has a configuration similar to that of the first preferred embodiment.

Shown in FIG. 7 is a table that lists values of some optical parameters corresponding to the surfaces 31-81, 32-82 of the second preferred embodiment. The imaging lens 10 has an overall system focal length of 3.260 mm, an HFOV of 35.644°, an F-number of 2.40, and a system length of 3.925 mm.

Shown in FIG. 8 is a table that lists values of some optical parameters of the aforementioned optical relationship (1) corresponding to the second preferred embodiment.

Relationships among some of the aforementioned optical parameters corresponding to the second preferred embodiment are as follows:

$ALT=2.014$ mm $Gaa=0.864$ mm $BFL=1.047$ mm $(T3/T4)+(T4/T5)+(T5/T3)=3.147$ $T4/T2=1.497$ $BFL/G23=1.889$ $(G45+T3)/T2=2.992$ $T1/T2=2.694$ $T5/T3=1.123$ $G23/T3=1.276$ $Gaa/G23=1.560$ $ALT/T2=9.570$ $(T2+G23)/T1=1.348$

FIGS. 9(a) to 9(d) show simulation results corresponding to longitudinal spherical aberration, sagittal astigmatism aberration, tangential astigmatism aberration, and distortion aberration of the second preferred embodiment, respectively. It can be understood from FIGS. 9(a), 9(b), 9(c) and 9(d) that the second preferred embodiment is able to achieve a relatively good optical performance.

Figure 10:
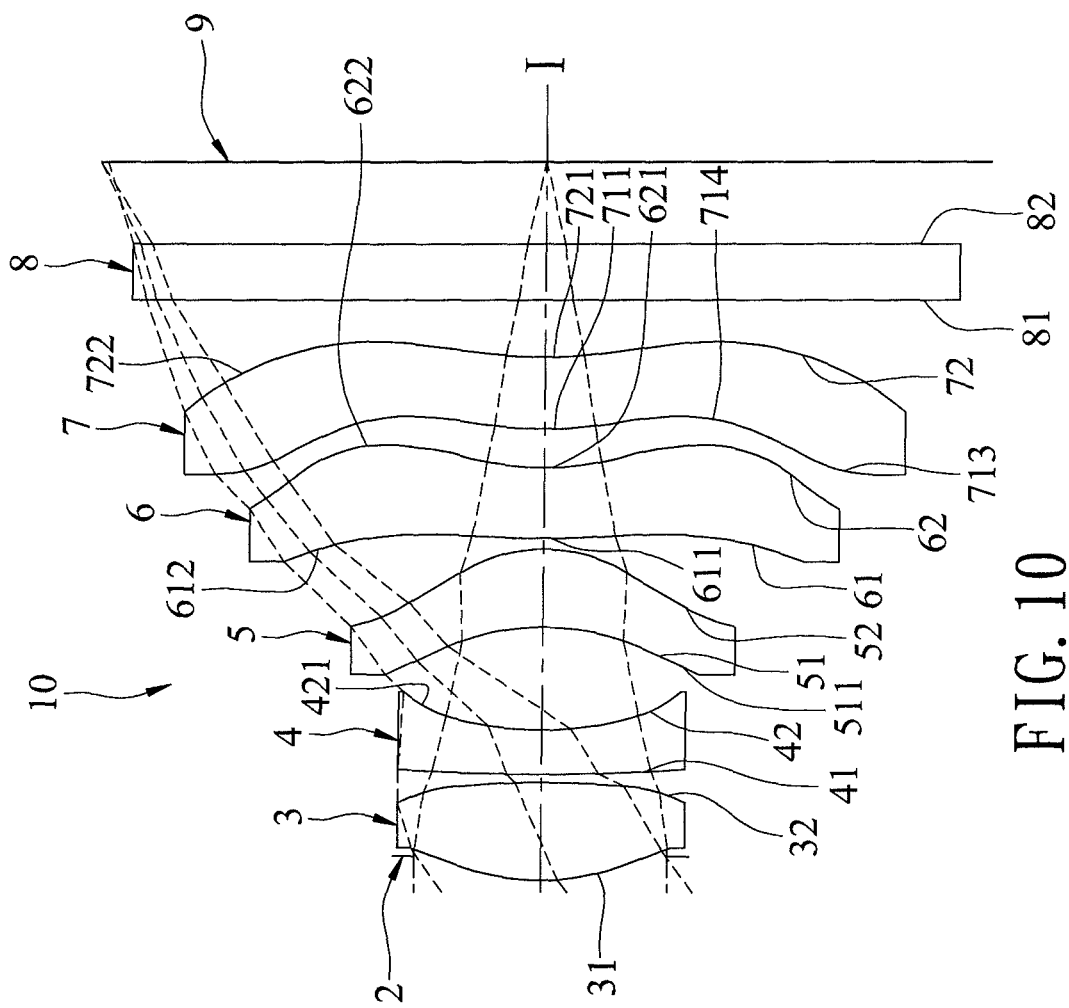
FIG. 10 is a schematic diagram that illustrates the third preferred embodiment of an imaging lens according to the present invention.
Figure 13:
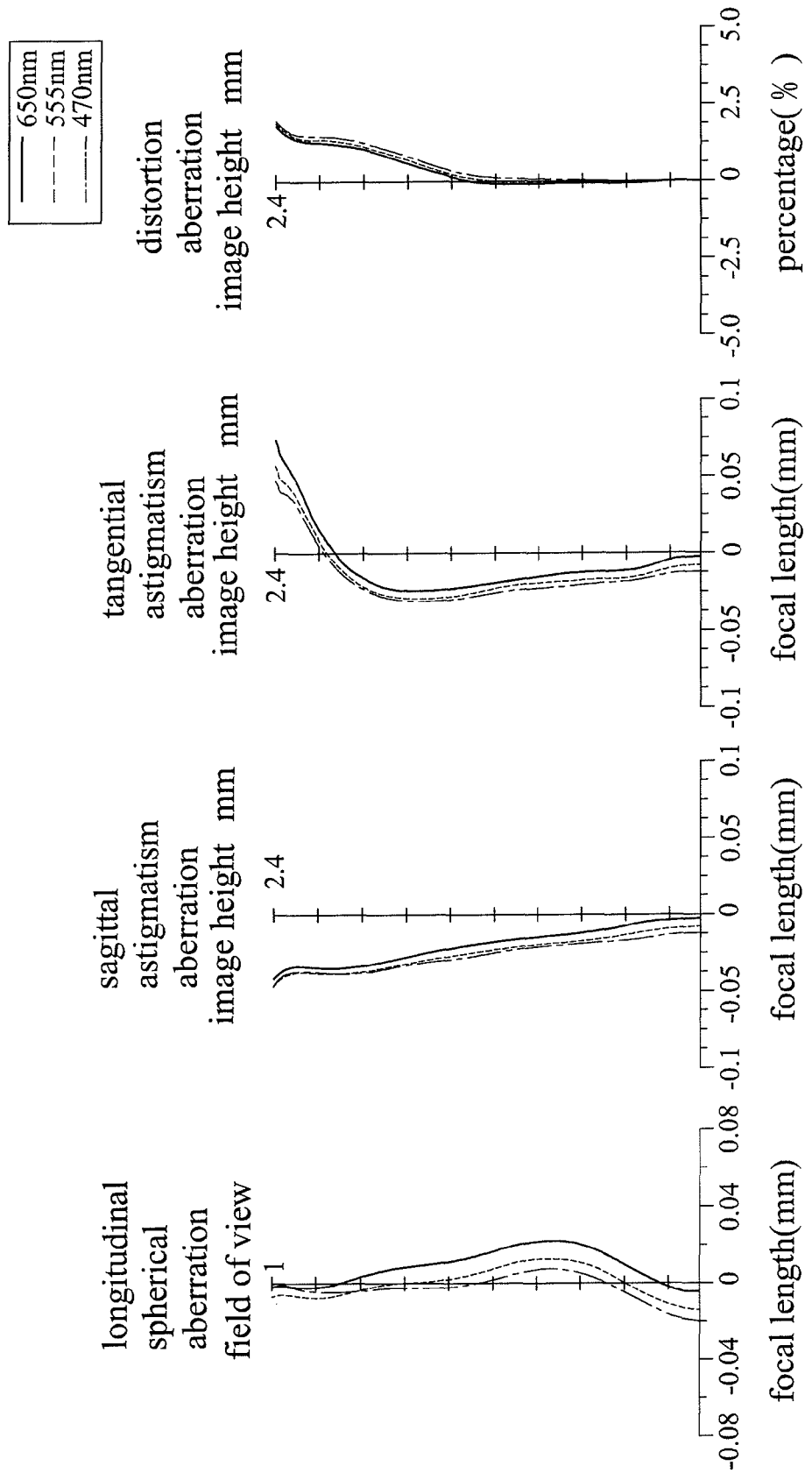
FIGS. 13(a) to 13(d) show different optical characteristics of the imaging lens of the third preferred embodiment.

Referring to FIG. 10, the differences between the first and third preferred embodiments of the imaging lens 10 of this invention reside in that:

The object-side surface 71 of the fifth lens element 7 has a first convex portion 711 in a vicinity of the optical axis (I), a second convex portion 713 in a vicinity of a periphery of the fifth lens element 7, and a concave portion 714 between the first and second convex portions 711, 713.

Shown in FIG. 11 is a table that lists values of some optical parameters corresponding to the surfaces 31-81, 32-82 of the third preferred embodiment. The imaging lens 10 has an overall system focal length of 3.226 mm, an HFOV of 36.097°, an F-number of 2.40, and a system length of 3.855 mm.

Shown in FIG. 12 is a table that lists values of some optical parameters of the aforementioned optical relationship (1) corresponding to the third preferred embodiment.

Relationships among some of the aforementioned optical parameters corresponding to the third preferred embodiment are as follows:

$ALT=1.933$ mm $Gaa=0.879$ mm $BFL=1.043$ mm $(T3/T4)+(T4/T5)+(T5/T3)=3.006$ $T4/T2=1.642$ $BFL/G23=1.918$ $(G45+T3)/T2=2.733$ $T1/T2=2.239$ $T5/T3=0.940$ $G23/T3=1.310$ $Gaa/G23=1.617$ $ALT/T2=8.368$ $(T2+G23)/T1=1.498$

FIGS. 13(a) to 13(d) show simulation results corresponding to longitudinal spherical aberration, sagittal astigmatism aberration, tangential astigmatism aberration, and distortion aberration of the third preferred embodiment, respectively. It can be understood from FIGS. 13(a), 13(b), 13(c) and 13(d) that the third preferred embodiment is likewise able to achieve a relatively good optical performance.

Figure 14:
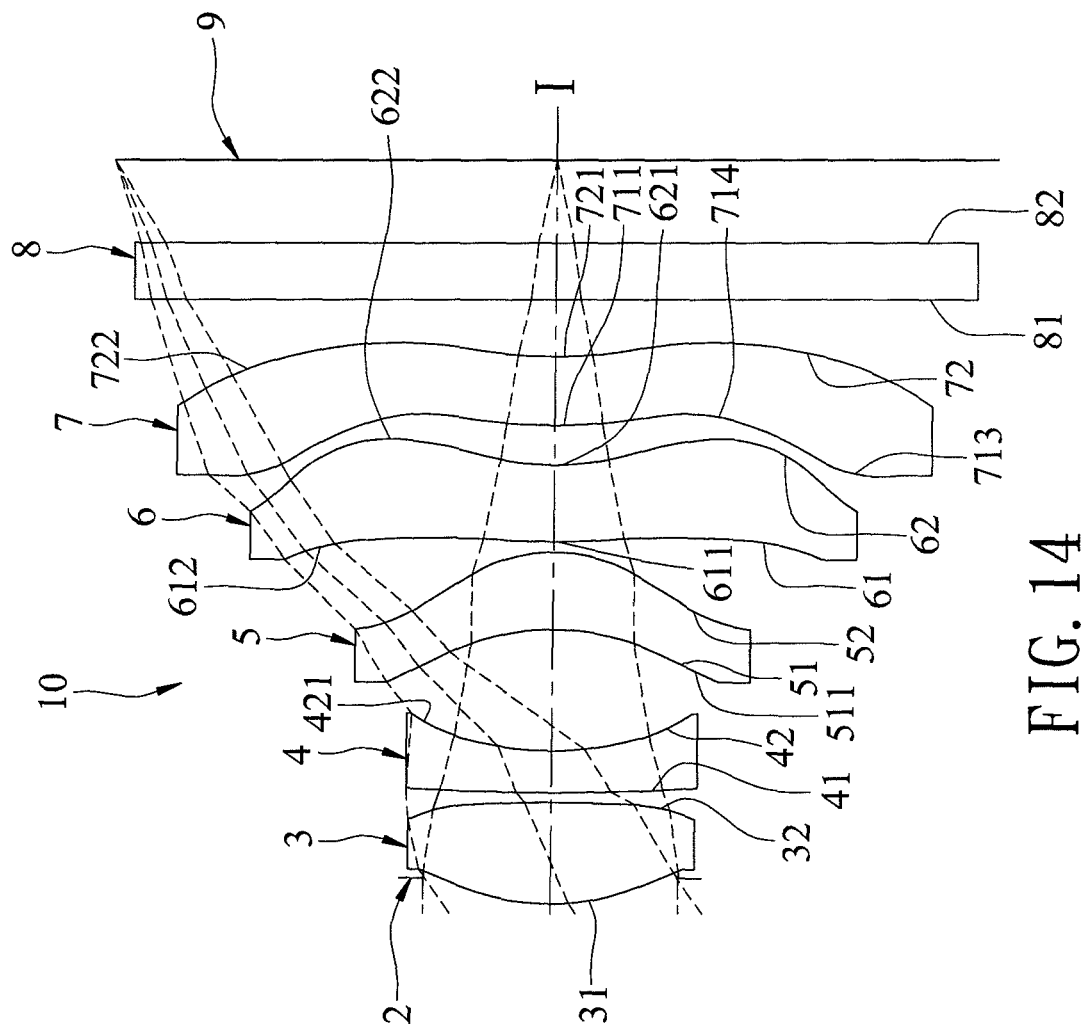
FIG. 14 is a schematic diagram that illustrates the fourth preferred embodiment of an imaging lens according to the present invention.
Figures 17A, 17B, 17C, 17D:
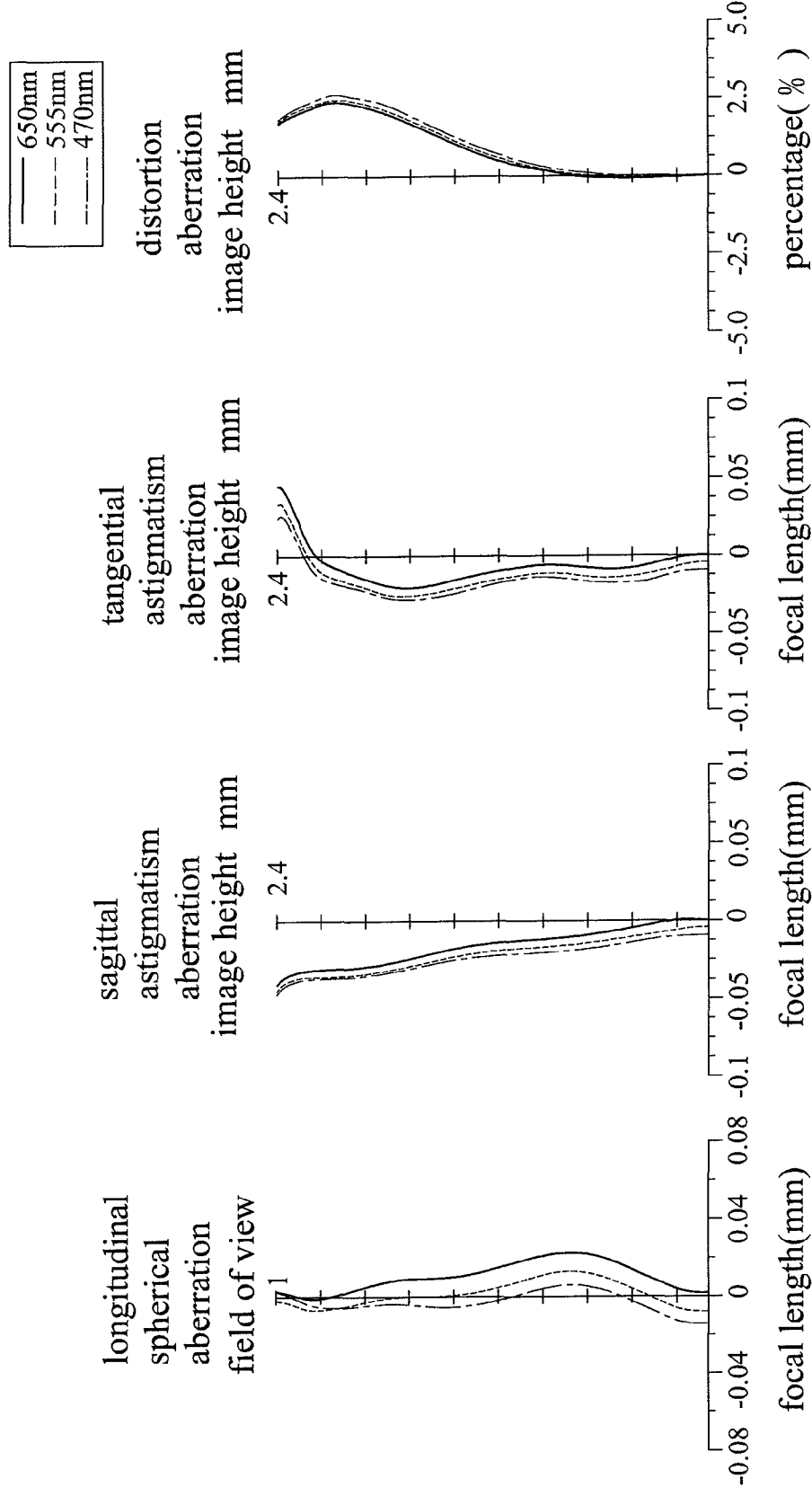
FIGS. 17(a) to 17(d) show different optical characteristics of the imaging lens of the fourth preferred embodiment.

FIG. 14 illustrates the fourth preferred embodiment of an imaging lens 10 according to the present invention, which has a configuration similar to that of the third preferred embodiment.

Shown in FIG. 15 is a table that lists values of some optical parameters corresponding to the surfaces 31-81, 32-82 of the fourth preferred embodiment. The imaging lens 10 has an overall system focal length of 3.288 mm, an HFOV of 35.669°, an F-number of 2.40, and a system length of 3.942 mm.

Shown in FIG. 16 is a table that lists values of some optical parameters of the aforementioned optical relationship (1) corresponding to the fourth preferred embodiment.

Relationships among some of the aforementioned optical parameters corresponding to the fourth preferred embodiment are as follows:

ALT=1.960 mm

Gaa=0.951 mm

BFL=1.031 mm (T3/T4)+(T4/T5)+(T5/T3)=3.005

T4/T2=1.739

BFL/G23=1.623

(G45+T3)/T2=2.609

T1/T2=2.300

T5/T3=0.931

G23/T3=1.561

Gaa/G23=1.497

ALT/T2=8.412

(T2+G23)/T1=1.620

FIGS. 17(a) to 17(d) show simulation results corresponding to longitudinal spherical aberration, sagittal astigmatism aberration, tangential astigmatism aberration, and distortion aberration of the fourth preferred embodiment, respectively. It can be understood from FIGS. 17(a), 17(b), 17(c) and 17(d) that the fourth preferred embodiment is likewise able to achieve a relatively good optical performance.

Figure 18:
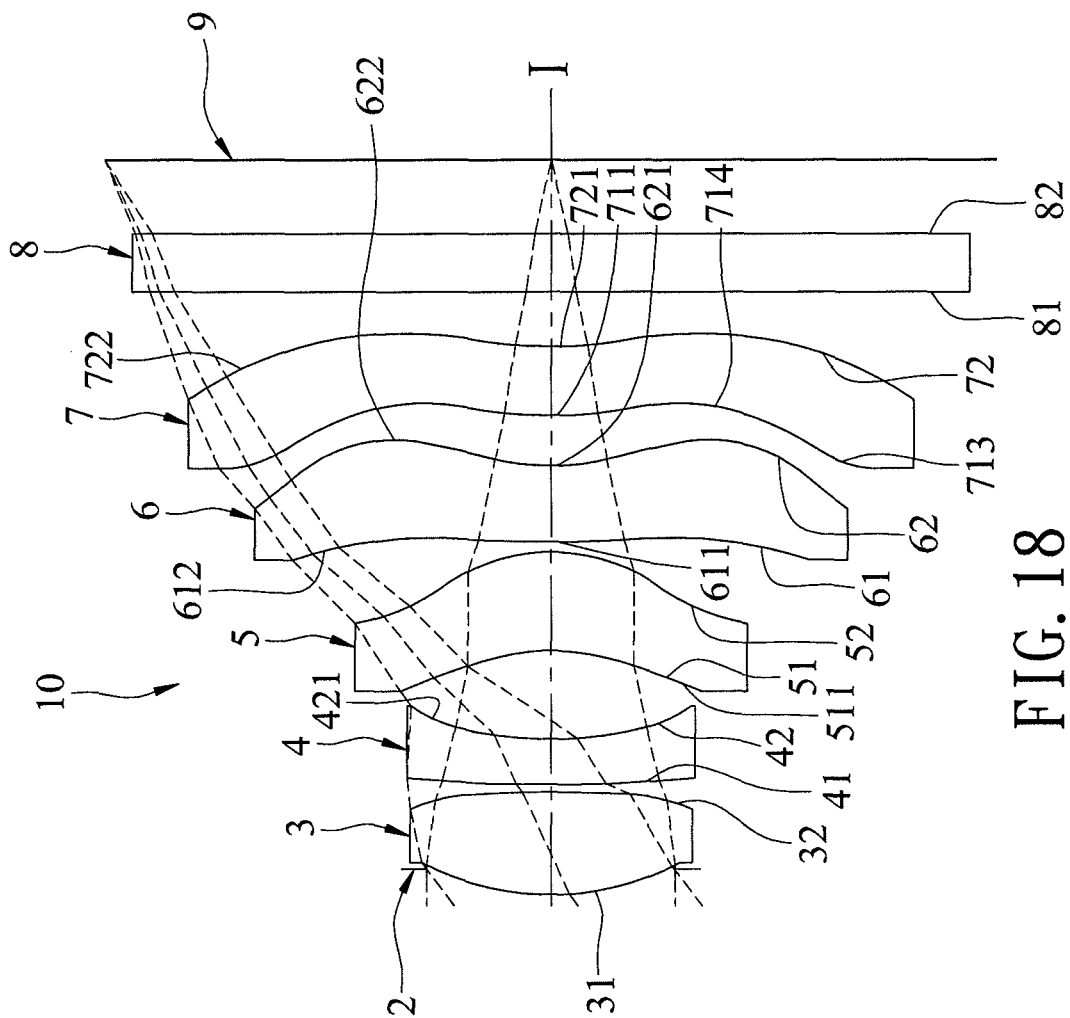
FIG. 18 is a schematic diagram that illustrates the fifth preferred embodiment of an imaging lens according to the present invention.
Figures 21A, 21B, 21C, 21D:
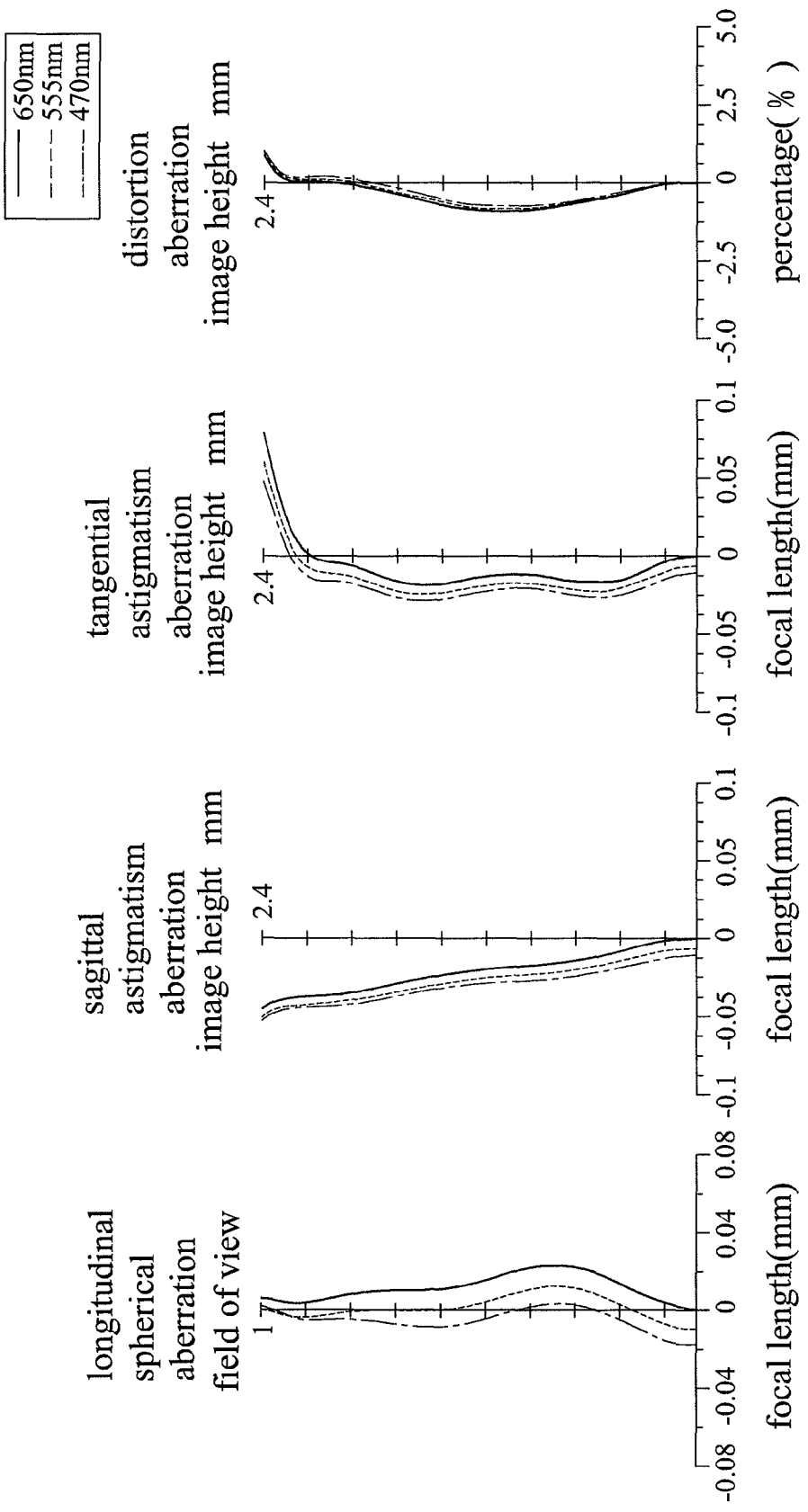
FIGS. 21(a) to 21(d) show different optical characteristics of the imaging lens of the fifth preferred embodiment.

FIG. 18 illustrates the fifth preferred embodiment of an imaging lens 10 according to the present invention, which has a configuration similar to that of the third preferred embodiment.

Shown in FIG. 19 is a table that lists values of some optical parameters corresponding to the surfaces 31-81, 32-82 of the fifth preferred embodiment. The imaging lens 10 has an overall system focal length of 3.217 mm, an HFOV of 36.429°, an F-number of 2.40, and a system length of 3.943 mm.

Shown in FIG. 20 is a table that lists values of some optical parameters of the aforementioned optical relationship (1) corresponding to the fifth preferred embodiment.

Relationships among some of the aforementioned optical parameters corresponding to the fifth preferred embodiment are as follows:

ALT=2.085 mm

Gaa=0.862 mm

BFL=0.996 mm (T3/T4)+(T4/T5)+(T5/T3)=3.106

T4/T2=1.750

BFL/G23=2.127

(G45+T3)/T2=3.490

T1/T2=2.366

T5/T3=0.697

G23/T3=0.875

Gaa/G23=1.840

ALT/T2=9.066

(T2+G23)/T1=1.284

FIGS. 21(a) to 21(d) show simulation results corresponding to longitudinal spherical aberration, sagittal astigmatism aberration, tangential astigmatism aberration, and distortion aberration of the fifth preferred embodiment, respectively. It can be understood from FIGS. 21(a), 21(b), 21(c) and 21(d) that the fifth preferred embodiment is likewise able to achieve a relatively good optical performance.

Figure 22:
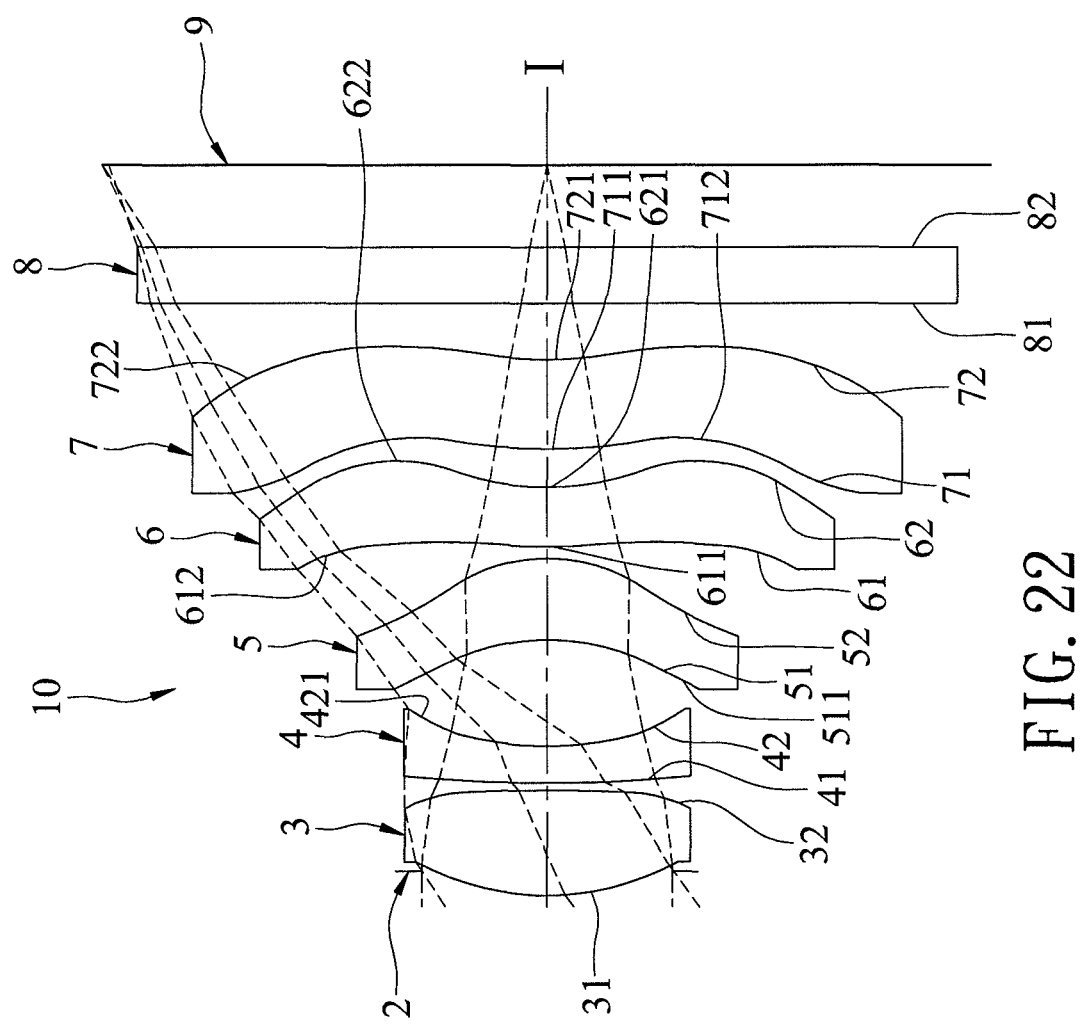
FIG. 22 is a schematic diagram that illustrates the sixth preferred embodiment of an imaging lens according to the present invention.
Figures 25A, 25B, 25C, 25D:
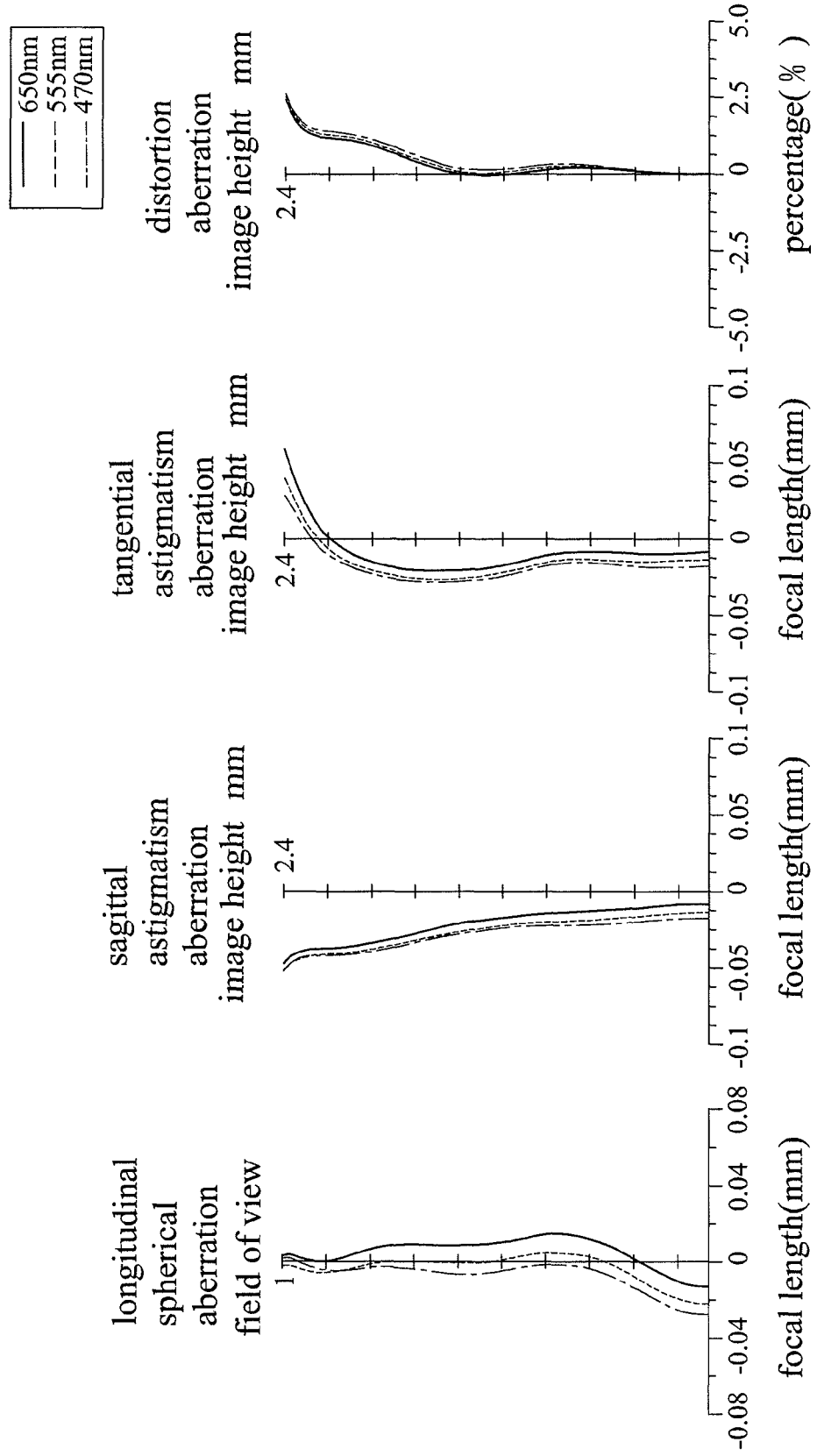
FIGS. 25(a) to 25(d) show different optical characteristics of the imaging lens of the sixth preferred embodiment.

FIG. 22 illustrates the sixth preferred embodiment of an imaging lens 10 according to the present invention, which has a configuration similar to that of the first preferred embodiment.

Shown in FIG. 23 is a table that lists values of some optical parameters corresponding to the surfaces 31-81, 32-82 of the sixth preferred embodiment. The imaging lens 10 has an overall system focal length of 3.255 mm, an HFOV of 35.628°, an F-number of 2.40, and a system length of 3.924 mm.

Shown in FIG. 24 is a table that lists values of some optical parameters of the aforementioned optical relationship (1) corresponding to the sixth preferred embodiment.

Relationships among some of the aforementioned optical parameters corresponding to the sixth preferred embodiment are as follows:

ALT=2.006 mm

Gaa=0.876 mm

BFL=1.043 mm (T3/T4)+(T4/T5)+(T5/T3)=3.137

T4/T2=1.625

BFL/G23=1.858

(G45+T3)/T2=3.248

T1/T2=2.885

T5/T3=1.102

G23/T3=1.278

Gaa/G23=1.561

ALT/T2=10.205

(T2+G23)/T1=1.336

FIGS. 25(a) to 25(d) show simulation results corresponding to longitudinal spherical aberration, sagittal astigmatism aberration, tangential astigmatism aberration, and distortion aberration of the sixth preferred embodiment, respectively. It can be understood from FIGS. 25(a), 25(b), 25(c) and 25(d) that the sixth preferred embodiment is likewise able to achieve a relatively good optical performance.

Figure 26:
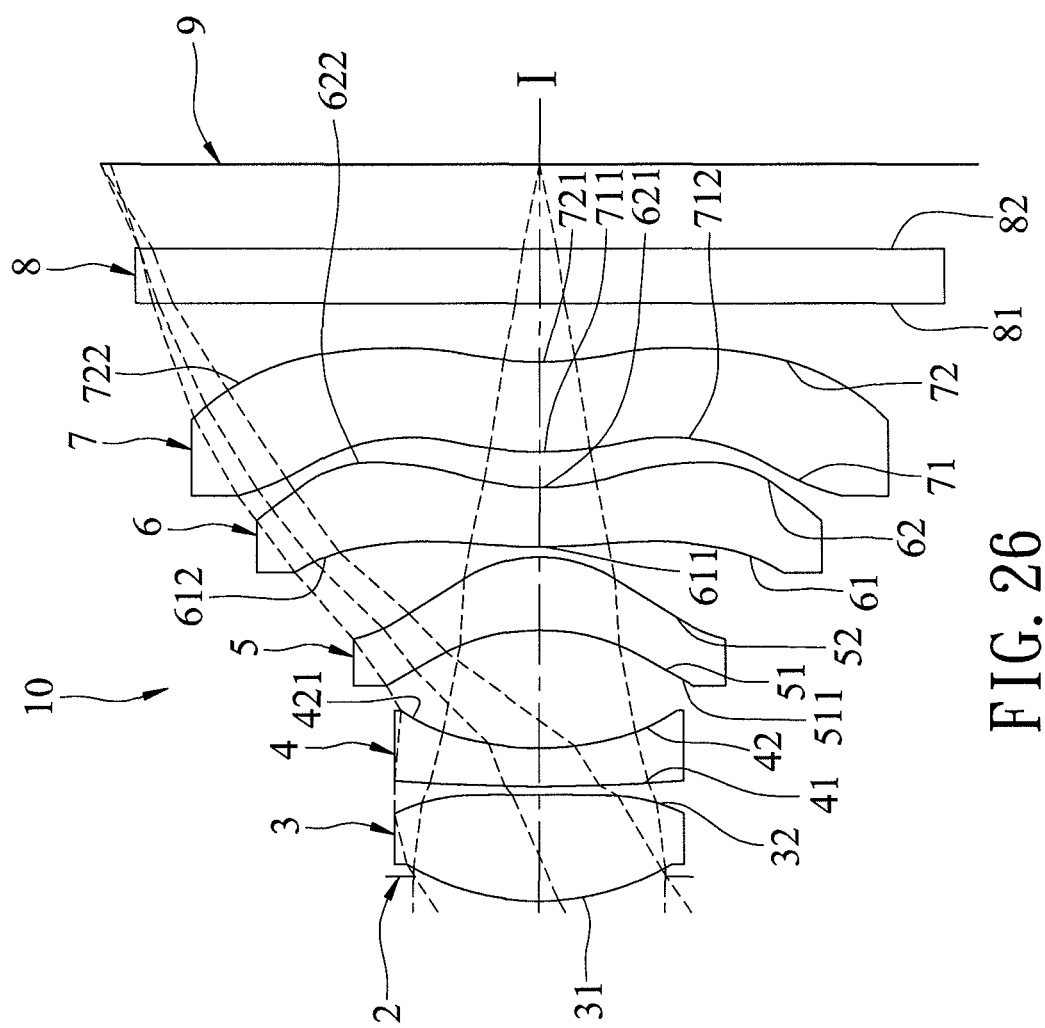
FIG. 26 is a schematic diagram that illustrates the seventh preferred embodiment of an imaging lens according to the present invention.
Figure 29:
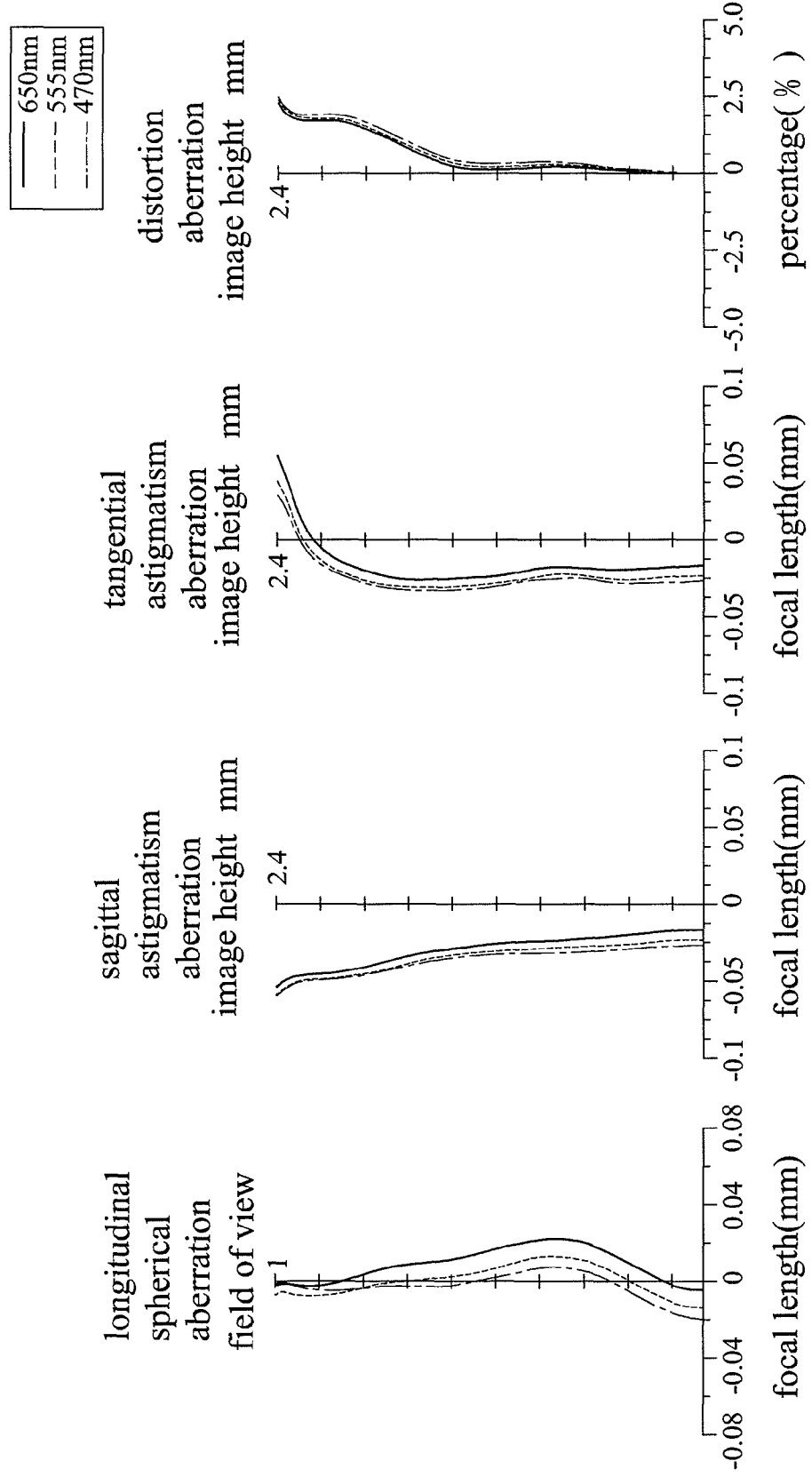
FIGS. 29(a) to 29(d) show different optical characteristics of the imaging lens of the seventh preferred embodiment.

FIG. 26 illustrates the seventh preferred embodiment of an imaging lens 10 according to the present invention, which has a configuration similar to that of the first preferred embodiment.

Shown in FIG. 27 is a table that lists values of some optical parameters corresponding to the surfaces 31-81, 32-82 of the seventh preferred embodiment. The imaging lens 10 has an overall system focal length of 3.311 mm, an HFOV of 35.047°, an F-number of 2.40, and a system length of 3.927 mm.

Shown in FIG. 28 is a table that lists values of some optical parameters of the aforementioned optical relationship (1) corresponding to the seventh preferred embodiment.

Relationships among some of the aforementioned optical parameters corresponding to the seventh preferred embodiment are as follows:

$ALT=1.957$ mm $Gaa=0.926$ mm $BFL=1.045$ mm $(T3/T4)+(T4/T5)+(T5/T3)=3.124$ $T4/T2=1.499$ $BFL/G23=1.693$ $(G45+T3)/T2=2.742$ $T1/T2=2.703$ $T5/T3=1.255$ $G23/T3=1.615$ $Gaa/G23=1.500$ $ALT/T2=9.296$ $(T2+G23)/T1=1.455$

FIGS. 29(a) to 29(d) show simulation results corresponding to longitudinal spherical aberration, sagittal astigmatism aberration, tangential astigmatism aberration, and distortion aberration of the seventh preferred embodiment, respectively. It can be understood from FIGS. 29(a), 29(b), 29(c) and 29(d) that the seventh preferred embodiment is likewise able to achieve a relatively good optical performance.

Shown in FIG. 30 is a table that lists the aforesaid relationships among some of the aforementioned optical parameters corresponding to the seven preferred embodiments for comparison. When each of the optical parameters of the imaging lens 10 according to this invention satisfies the following optical relationships, the optical performance is still relatively good even with the reduced system length:

$3.00 \leq (T3/T4)+(T4/T5)+(T5/T3) \leq 3.20$     (2)

$1.20 \leq T4/T2$     (3)

$1.55 \leq BFL/G23$     (4)

$2.60 \leq (G45+T3)/T2$     (5)

$2.00 \leq T1/T2$     (6)

$0.85 \leq T5/T3$     (7)

$1.30 \leq G23/T3$     (8)

$Gaa/G23 \leq 1.80$     (9)

$8.0 \leq ALT/T2$     (10)

$(T2+G23)/T1 \leq 1.70$     (11)

When the relationship (2) is satisfied, differences among T3, T4 and T5 are small, thereby avoiding any one of the lens elements 5, 6, 7 from being too thick or too thin.

Since the second lens element 4 has the negative refractive power, T2 has to be relatively small. In addition, since the optical effective radius of the fourth lens element 6 is greater than that of the second lens element 4, T4 should be relatively large for reducing difficulty of manufacturing. Therefore, T4/T2 is preferred to be large and to satisfy the relationship (3). Preferably, T4/T2 ranges between 1.20 and 2.00.

Since the optical effective radius of the fifth lens element 7 is greater than that of the third lens element 5, difficulty of manufacturing is reduced when the relationship (7) is satisfied due to the same reason described above. Preferably, T5/T3 ranges between 0.85 and 1.30.

Since there must be a sufficient distance between the fifth lens element 7 and the image plane 9 for assembly or for containing the optical filter 8, BFL/G23 is preferred to satisfy the relationship (4) based upon experiment results. Preferably, BFL/G23 ranges between 1.55 and 2.50.

Since the image-side surface 62 of the fourth lens element 6 has the concave portion 621 in the vicinity of the optical axis (I), G45 cannot be effectively reduced. In addition, since the second lens element 4 has the negative refractive power, T2 should be reduced as much as possible, so that (G45+T3)/T2 is preferred to be large and to satisfy the relationship (5). Preferably, (G45+T3)/T2 ranges between 2.60 and 3.60.

Since the first lens element 3 is used to provide the positive refractive power of the entire imaging lens 10, thickness thereof should be relatively large, so that T1 is large. On the other hand, since the second lens element 4 has the negative refractive power, T2 should be relatively small. Therefore, T1/T2 is preferred to be large and to satisfy the relationship (6). Preferably, T1/T2 ranges between 2.00 and 3.00.

Small G23 or small T3 favors reduction of the system length of the imaging lens 10. However, the image-side surface 42 of the second lens element 4 has the concave portion 421, and the object-side surface 51 of the third lens element 5 has the concave portion 511, so that G23 cannot be effectively reduced. Therefore, G23/T3 is preferred to be large and to satisfy the relationship (8). Preferably, G23/T3 ranges between 1.30 and 2.00.

Small Gaa favors reduction of the system length of the imaging lens 10. However, G23 cannot be effectively reduced as described above, so that Gaa/G23 is preferred to be small and to satisfy the relationship (9). Preferably, Gaa/G23 ranges between 1.40 and 1.80.

Small ALT or small T2 favors reduction of the system length of the imaging lens 10. However, some of the lens elements have the positive refractive power, and thus the thicknesses thereof cannot be effectively reduced. However, T2 does not have such limitation. Therefore, ALT/T2 is preferred to be large and to satisfy the relationship (10). Preferably, ALT/T2 ranges between 8.00 and 11.00.

As described above, T2 should be relatively small and T1 should be relatively large while G23 should fall within an appropriate range, so that (T2+G23)/T1 is preferred to be small and to satisfy the relationship (11). Preferable, (T2+G23)/T1 ranges between 1.0 and 1.7.

To sum up, effects and advantages of the imaging lens 10 according to the present invention are described hereinafter.

1. By virtue of the positive refractive power of the first lens element 3, and the aperture stop 2 disposed in front of the first lens element 3, the system length of the imaging lens 10 may be reduced. In addition, by cooperation with the positive refractive power of the fifth lens element 7, the refractive power of the first lens element 3 may be distributed, so as to reduce sensitivity during manufacturing.

2. By virtue of the first convex portion 711, the second convex portion 713, and the concave portion 714 of the object-side surface 71 of the fifth lens element 7, optical abbreviations of the imaging lens 10 may be corrected.

3. Through design of the relevant optical parameters, such as (T3/T4)+(T4/T5)+(T5/T3), T4/T2, BFL/G23, (G45+T3)/T2, T1/T2, T5/T3, G23/T3, Gaa/G23, ALT/T2 and (T2+G23)/T1, optical aberrations, such as spherical aberration, may be reduced or even eliminated. Further, through surface design and arrangement of the lens elements 3-7, even when the system length is reduced, optical aberrations may still be reduced or eliminated, resulting in relatively good optical performance.

4. Through the aforesaid seven preferred embodiments, it is known that the system length of this invention may be reduced down to below 4 mm, so as to facilitate developing thinner relevant products with economic benefits.

Figure 31:
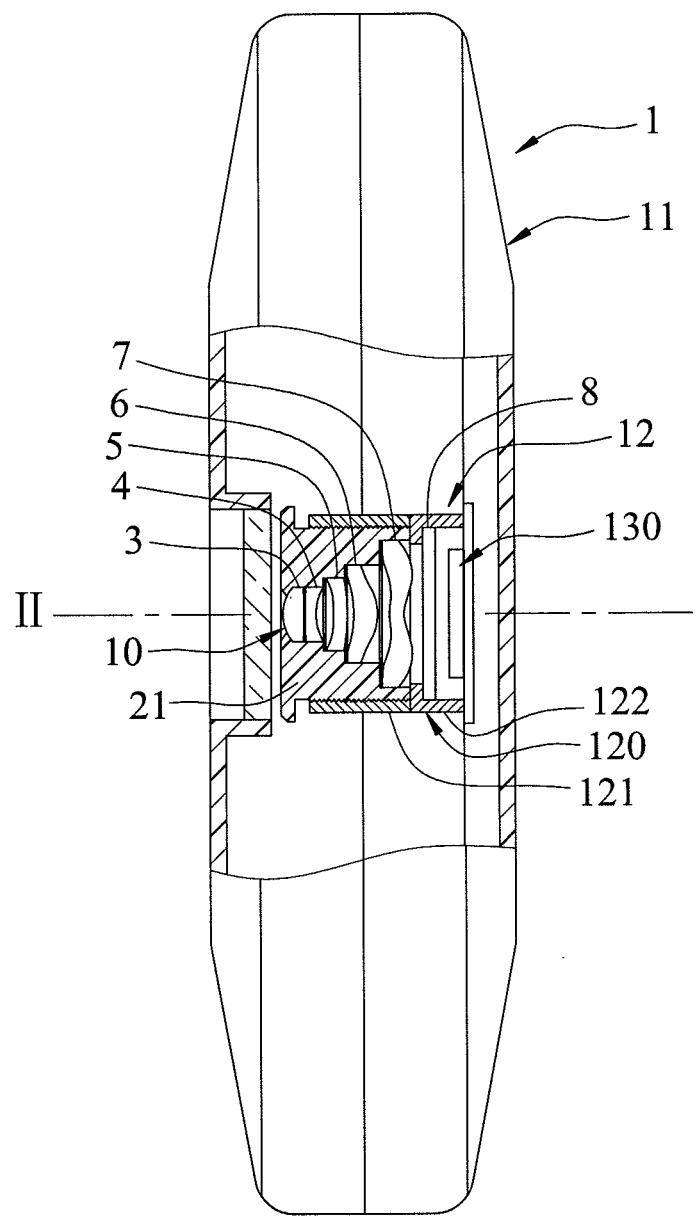
FIG. 31 is a schematic partly sectional view to illustrate a first exemplary application of the imaging lens of the present invention.

Shown in FIG. 31 is a first exemplary application of the imaging lens 10, in which the imaging lens 10 is disposed in a housing 11 of an electronic apparatus 1, and forms a part of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 9 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 32:
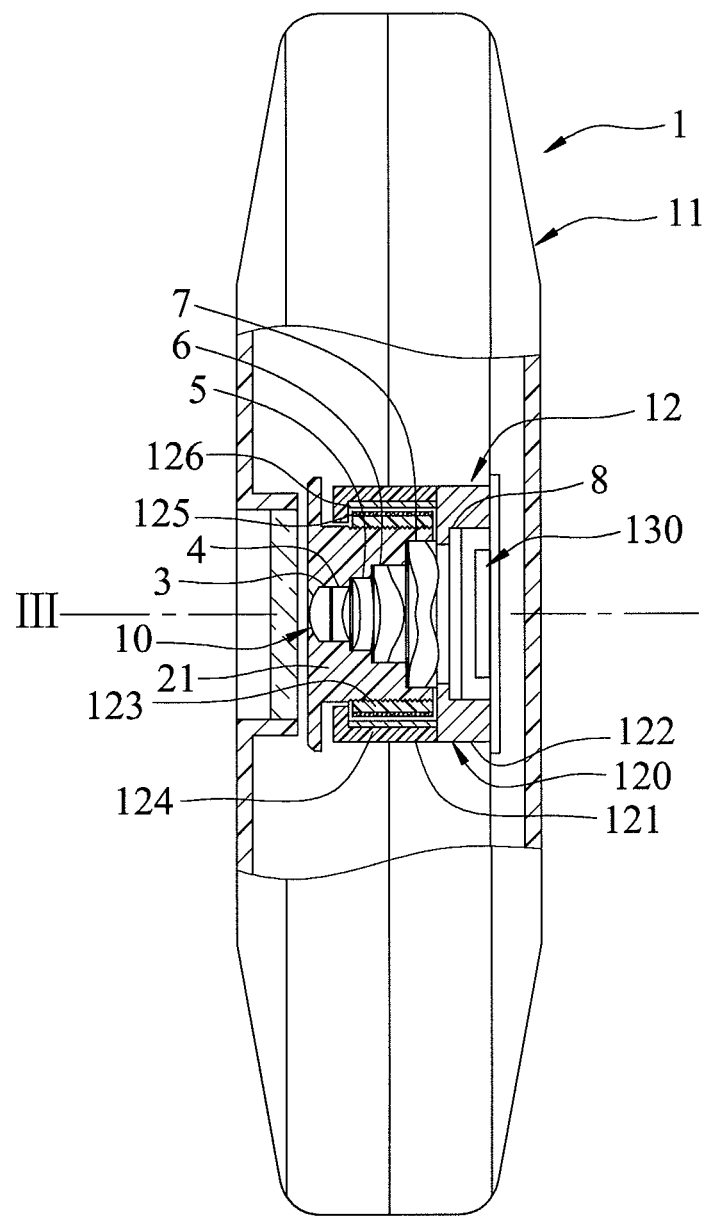
FIG. 32 is a schematic partly sectional view to illustrate a second exemplary application of the imaging lens of the present invention.

Shown in FIG. 32 is a second exemplary application of the imaging lens 10. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 8 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising an aperture stop and first, second, third, fourth and fifth lens elements arranged from an object side to an image side in the given order along an optical axis of said imaging lens, each of said first, second, third, fourth and fifth lens elements having an object-side surface facing toward the object side and an image-side surface facing toward the image side, wherein:

said first lens element has a positive refractive power, said object-side surface of said first lens element being a convex surface;

said second lens element has a negative refractive power, said image-side surface of said second lens element having a concave portion in a vicinity of a periphery of said second lens element;

said object-side surface of said third lens element has a concave portion in a vicinity of a periphery of said third lens element;

said image-side surface of said fourth lens element has a concave portion in a vicinity of the optical axis; and said image-side surface of said fifth lens element has a concave portion in a vicinity of the optical axis, and a convex portion in a vicinity of a periphery of said fifth lens element;

wherein said imaging lens does not include any lens element with refractive power other than said first, second, third, fourth and fifth lens elements, and satisfies $0.85 \leq T5/T3$, where T3 represents a distance between said object-side surface and said image-side surface of said third lens element at the optical axis, and T5 represents a distance between said object-side surface and said image-side surface of said fifth lens element at the optical axis.

2. An electronic apparatus comprising:

a housing; and an imaging module disposed in said housing, and including an imaging lens as claimed in claim 1, a barrel on which said imaging lens is disposed, a holder unit on which said barrel is disposed, and an image sensor disposed at the image side of said imaging lens.

3. The electronic apparatus as claimed in claim 2, wherein said holder unit includes a first holder portion in which said barrel is disposed, and said barrel is movable with respect to said image sensor along the optical axis.

4. The imaging lens as claimed in claim 1, satisfying $3.0 \leq (T3/T4)+(T4/T5)+(T5/T3) < 3.2$, where T3 represents a distance between said object-side surface and said image-side surface of said third lens element at the optical axis, T4 represents a distance between said object-side surface and said image-side surface of said fourth lens element at the optical axis, and T5 represents a distance between said object-side surface and said image-side surface of said fifth lens element at the optical axis.

5. The imaging lens as claimed in claim 4, further satisfying $2.65(G45+T3)/T2$, where G45 represents a distance between said image-side surface of said fourth lens element and said object-side surface of said fifth lens element at the optical axis, T3 represents a distance between said object-side surface and said image-side surface of said third lens element at the optical axis, and T2 represents a distance between said object-side surface and said image-side surface of said second lens element at the optical axis.

6. The imaging lens as claimed in claim 5, further satisfying $(T2+G23)/T1 \leq 1.7$, where T2 represents a distance between said object-side surface and said image-side surface of said second lens element at the optical axis, G23 represents a distance between said image-side surface of said second lens element and said object-side surface of said third lens element at the optical axis, and T1 represents a distance between said object-side surface and said image-side surface of said first lens element at the optical axis.

7. The imaging lens as claimed in claim 5, wherein said fifth lens element has a positive refractive power, said imaging lens further satisfying 8≤ALT/T2, where ALT represents a sum of a distance between said object-side surface and said image-side surface of said first lens element at the optical axis, a distance between said object-side surface and said image-side surface of said second lens element at the optical axis, a distance between said object-side surface and said image-side surface of said third lens element at the optical axis, a distance between said object-side surface and said image-side surface of said fourth lens element at the optical axis, and a distance between said object-side surface and said image-side surface of said fifth lens element at the optical axis, and T2 represents the distance between said object-side surface and said image-side surface of said second lens element at the optical axis.

8. The imaging lens as claimed in claim 5, wherein said object-side surface of said fifth lens element has a first convex portion in a vicinity of the optical axis, a second convex portion in a vicinity of the periphery of said fifth lens element, and a concave portion between said first and second convex portion.

9. The imaging lens as claimed in claim 4, further satisfying 1.2≤T4/T2, where T2 represents a distance between said object-side surface and said image-side surface of said second lens element at the optical axis, and T4 represents a distance between said object-side surface and said image-side surface of said fourth lens element at the optical axis.

10. The imaging lens as claimed in claim 9, further satisfying 1.55≤BFL/G23, where BFL represents a distance at the optical axis between said image-side surface of said fifth lens element and an image plane at the image side, and G23 represents a distance between said image-side surface of said second lens element and said object-side surface of said third lens element at the optical axis.

11. The imaging lens as claimed in claim 10, further satisfying 2.0≤T1/T2, where T1 represents a distance between said object-side surface and said image-side surface of said first lens element at the optical axis, and T2 represents a distance between said object-side surface and said image-side surface of said second lens element at the optical axis.

12. The imaging lens as claimed in claim 10, further satisfying 1.3≤G23/T3, where G23 represents a distance between said image-side surface of said second lens element and said object-side surface of said third lens element at the optical axis, and T3 represents a distance between said object-side surface and said image-side surface of said third lens element at the optical axis.

13. The imaging lens as claimed in claim 10, wherein said object-side surface of said second lens element is a convex surface.

14. The imaging lens as claimed in claim 4, further satisfying 1.55≤BFL/G23, where BFL represents a distance at the optical axis between said image-side surface of said fifth lens element and an image plane at the image side, and G23 represents a distance between said image-side surface of said second lens element and said object-side surface of said third lens element at the optical axis.

15. The imaging lens as claimed in claim 14, further satisfying 8≤ALT/T2, where ALT represents a sum of a distance between said object-side surface and said image-side surface of said first lens element at the optical axis, a distance between said object-side surface and said image-side surface of said second lens element at the optical axis, a distance between said object-side surface and said image-side surface of said third lens element at the optical axis, a distance between said object-side surface and said image-side surface of said fourth lens element at the optical axis, and a distance between said object-side surface and said image-side surface of said fifth lens element at the optical axis; and T2 represents the distance between said object-side surface and said image-side surface of said second lens element at the optical axis.

16. The imaging lens as claimed in claim 14, further satisfying 2.65≤(G45+T3)/T2, where G45 represents a distance between said image-side surface of said fourth lens element and said object-side surface of said fifth lens element at the optical axis, T3 represents a distance between said object-side surface and said image-side surface of said third lens element at the optical axis, and T2 represents a distance between said object-side surface and said image-side surface of said second lens element at the optical axis.

17. The imaging lens as claimed in claim 16, further satisfying Gaa/G23≤1.8, where Gaa represents a sum of a distance between said image-side surface of said first lens element and said object-side surface of said second lens element at the optical axis, a distance between said image-side surface of said second lens element and said object-side surface of said third lens element at the optical axis, a distance between said image-side surface of said third lens element and said object-side surface of said fourth lens element at the optical axis, and a distance between said image-side surface of said fourth lens element and said object-side surface of said fifth lens element at the optical axis, and G23 represents the distance between said image-side surface of said second lens element and said object-side surface of said third lens element at the optical axis.

18. The imaging lens as claimed in claim 16, wherein said object-side surface of said fifth lens element has a convex portion in a vicinity of the periphery of said fifth lens element.

* * * * *